United States Patent
Shiota et al.

(10) Patent No.: US 7,414,682 B2
(45) Date of Patent: Aug. 19, 2008

(54) LIQUID CRYSTAL DISPLAY UNIT AND PRODUCTION METHOD THEREOF

(75) Inventors: Akinori Shiota, Osaka (JP); Hiroyuki Yamakita, Osaka (JP); Shinji Ogawa, Ishikawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/343,464

(22) PCT Filed: Jul. 31, 2001

(86) PCT No.: PCT/JP01/06575

§ 371 (c)(1),
(2), (4) Date: Jun. 17, 2003

(87) PCT Pub. No.: WO02/10850

PCT Pub. Date: Feb. 7, 2002

(65) Prior Publication Data

US 2004/0027524 A1     Feb. 12, 2004

(30) Foreign Application Priority Data

Jul. 31, 2000   (JP) ............................. 2000-230449

(51) Int. Cl.
G02F 1/1335 (2006.01)
G02F 1/1337 (2006.01)
G02F 1/1343 (2006.01)

(52) U.S. Cl. ..................... 349/114; 349/129; 349/139; 349/141; 349/147

(58) Field of Classification Search ................ 349/129, 349/139, 128, 141, 147, 114
See application file for complete search history.

(56) References Cited

U.S. PATENT DOCUMENTS

| | | | |
|---|---|---|---|
| 5,734,455 A | | 3/1998 | Yoshida et al. |
| 5,781,262 A | * | 7/1998 | Suzuki et al. ............... 349/128 |
| 6,067,140 A | * | 5/2000 | Woo et al. .................... 349/129 |
| 6,104,450 A | | 8/2000 | Hiraishi |
| 6,256,082 B1 | * | 7/2001 | Suzuki et al. ............... 349/144 |
| 6,335,770 B1 | * | 1/2002 | Komatsu ...................... 349/38 |
| 6,335,776 B1 | * | 1/2002 | Kim et al. .................... 349/129 |
| 6,466,291 B1 | * | 10/2002 | Ham ............................ 349/141 |
| 6,466,293 B1 | * | 10/2002 | Suzuki et al. ............... 349/144 |
| 6,583,836 B2 | * | 6/2003 | Kim et al. .................... 349/129 |
| 6,583,840 B1 | * | 6/2003 | Inoue et al. .................. 349/141 |

FOREIGN PATENT DOCUMENTS

| | | |
|---|---|---|
| EP | 884626 A2 | 12/1998 |
| EP | 1 103 840 A2 | 5/2001 |

(Continued)

*Primary Examiner*—Julie-Huyen Ngo
(74) *Attorney, Agent, or Firm*—McDermott Will & Emery LLP

(57) ABSTRACT

An object of the present invention is to provide a liquid crystal display having a high luminance and a high contrast and a fabrication method thereof. To achieve the above object, a liquid crystal display of the present invention includes a liquid crystal panel for displaying an image by changing transmittance of a display light and one or more structures (151), (152) for dividing a pixel (103) of the liquid crystal panel into a plurality of domains (391), in which at least part of the structure (151) is constituted by a light-transmitting portion (151B) and a light-non-transmitting portion (151A).

11 Claims, 23 Drawing Sheets

FOREIGN PATENT DOCUMENTS

| | | |
|---|---|---|
| EP | 1 111 441 A2 | 6/2001 |
| GB | 2338580 | 12/1999 |
| JP | 4-337711 | 11/1992 |
| JP | 5-224210 | 9/1993 |
| JP | 6-273781 | 9/1994 |
| JP | 7-13164 | 1/1995 |
| JP | 07-306404 | 11/1995 |
| JP | 11-242225 | 9/1999 |
| JP | 11-311789 | 11/1999 |
| JP | 2000-075807 A | 3/2000 |
| JP | 2000-131717 | 5/2000 |
| WO | WO 97/10530 | 3/1997 |

* cited by examiner (a)

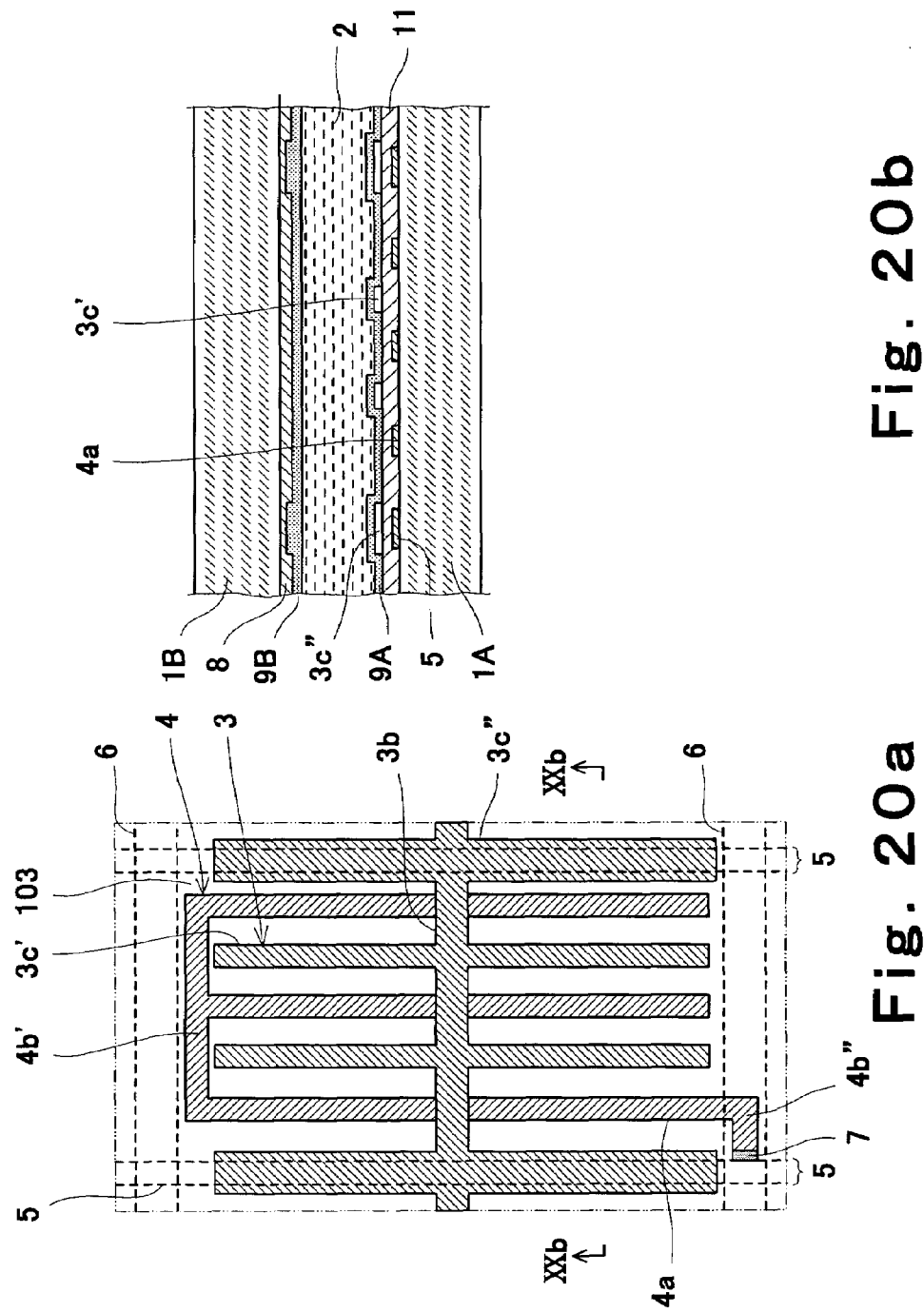

LIQUID CRYSTAL DISPLAY UNIT AND PRODUCTION METHOD THEREOF

TECHNICAL FIELD

The present invention relates to a liquid crystal display and a fabrication method thereof.

BACKGROUND ART

Conventionally, there have been provided IPS (In-Plane-Switching)-mode (transversal electric field type) liquid crystal displays as liquid crystal displays having a wide viewing angle characteristic. However, in the IPS-mode liquid crystal display, since a pixel electrode for modulating liquid crystal and a counter electrode are required to be located relatively close to one another on one of a pair of substrates retaining the liquid crystal therebetween, a display light incident on a liquid crystal panel is blocked by both electrodes, thereby reducing a display light emanating from the liquid crystal panel. Consequently, luminance of a display screen is decreased.

An IPS-mode liquid crystal display for the purpose of addressing this problem has been disclosed, for example, in Japanese Laid-Open Patent Publication No. Hei 9-73101. FIG. 25 is a plan view schematically showing a pixel structure of the liquid crystal display. As shown in FIG. 25, in a pixel 402 of the liquid crystal display 401 in a plan view, a comb-teeth shaped pixel electrode 403 and a counter electrode 404 are disposed so as to oppose to one another, and at least one of the pixel electrode 403 and the counter electrode 404 is constituted by a transparent electric conductor, thereby reducing the amount of display light to be blocked by the electrodes 403, 404. Consequently, luminance of a display screen is increased correspondingly.

However, there is a problem in the liquid crystal display 401 as described below. FIGS. 26a and 26b are views schematically showing an operation of the liquid crystal display 401, wherein FIG. 26a is a sectional view showing an electric field and an alignment of liquid crystal molecules in a pixel, and FIG. 26a is a sectional view showing a transmittance distribution in the pixel. In these figures, constitutions of array substrates are simplified for the sake of illustration. In addition, the pixel electrode 403 and counter electrode 404 are here constituted by transparent electric conductors. As shown in FIG. 26a, the pixel electrode 403 and counter electrode 404 are provided on the array substrate 411 so as to oppose to one another juxtaposed to one another) on the plane in which the array substrate 411 is present. Therefore, when a voltage is applied across the pixel electrode 403 and the counter electrode 404, an electric field is formed such that both of the electrodes 403, 404 are connected by bow-shaped lines of electric force 406, and liquid crystal molecules 405 are aligned along the lines of electric force. However, in an central portion of each of the electrodes 403, 404, there is formed a boundary of the lines of electric force of opposite directions, where liquid crystal molecules are aligned vertically with respect to the array substrate 411 (hereinafter, simply referred to as vertically) and along the lines of electrical force extending toward a point at infinity, thereby forming a liquid crystal disclination area 301. That is, the pixel is divided by the pixel electrodes 403 and the counter electrodes 404 into a plurality of domains. As a result, as shown in FIG. 26b, transmittance 302 of the liquid crystal panel (transmittance in a state in which a voltage is applied in a normally black mode; hereinafter simply referred to as transmittance) becomes high in an area located between the electrodes 403, 404 of the liquid crystal where the liquid molecules 405 are aligned horizontally with respect to the array substrate (hereinafter, referred to as horizontally) because a modulation rate of the liquid crystal molecules 405 becomes large, transmittance 302 becomes low in the disclination area 301 where the liquid molecules 405 are aligned vertically because a modulation rate of the liquid crystal molecules 405 becomes small, and transmittance 302 becomes medium in an area located above an portion other than the central portion of each of the electrodes 403, 404 where the liquid molecules 405 are aligned obliquely because a modulation rate of the liquid crystal molecules 405 becomes medium. The area 303 where the transmittance 302 is high, the area 304 where the transmittance 302 is medium, and the disclination area 301 respectively become a high contrast area, medium contrast area, and low contrast area. As described in the foregoing, since a display area includes the low contrast area 301, an average contrast of the display screen of the liquid crystal display 401 is reduced.

DISCLOSURE OF THE INVENTION

The present invention has been developed to address the above-described problem and an object thereof is to provide a liquid crystal display having a high luminance and a high contrast.

In order to achieve the object, the present invention consists of two aspects. In a first aspect, portions located below low contrast areas of light-transmitting electrode and the like are made to be light-non-transmitting portions, thereby improving contrast while keeping an effect of improvement of luminance. In a second aspect, reflectance of electrodes and the like is increased, thereby improving luminance without reducing contrast.

More specifically, a liquid crystal display according to the present invention comprises a liquid crystal panel for displaying an image by changing a transmittance of a display light and one or more structures dividing a pixel of the liquid crystal panel into a plurality of domains, characterized in that at least part of the structure is constituted by a light-transmitting portion and a light-non-transmitting portion. With this constitution, by locating the light-non-transmitting portion below a boundary portion of the domains formed on the structure, a display light incident on the light-transmitting portion transmits therethrough, thereby improving luminance of a display screen correspondingly. On the other hand, since a light incident on the light-non-transmitting portion does not transmit therethrough, the boundary portion of the domains that is a low contrast area is excluded from a display area, thereby improving an average contrast of the display screen correspondingly.

The structure may comprise a light-transmitting layer serving as the light-transmitting portion and a light-non-transmitting layer serving as the light-non-transmitting portion formed on inner surfaces of a pair of substrates retaining liquid crystal therebetween in the liquid crystal panel. In this constitution, the light-transmitting portion and the light-non-transmitting portion can easily be formed by photolithography.

The structure may divide the pixel into a plurality of domains by controlling an alignment of the liquid crystal. In this constitution, the present invention can be applied to a MVA-mode liquid crystal display.

The light-transmitting layer and the light-non-transmitting layer of the structure may be respectively constituted by a light-transmitting dielectric substance and a light-non-transmitting component. In this constitution, luminance and contrast can be improved in the MVA-mode liquid crystal display.

In the above case, the structure may divide the pixel into a plurality of domains by applying a voltage to the liquid crystal. In this constitution, the present invention can be applied to a PVA-mode and transversal electric field type liquid crystal display.

The light-transmitting layer and the light-non-transmitting layer of the structure may be respectively constituted by a light-transmitting electric conductor and a light-non-transmitting electric conductor. In this constitution, luminance and contrast can be improved in the PVA-mode and transversal electric field type liquid crystal display.

In the above case, the structure may be formed such that the light-non-transmitting layer is surrounded by the light-transmitting layer when seen in a direction perpendicular to the liquid crystal panel. In this constitution, since a low contrast area is typically formed in a central portion of the structure, proper exclusion of the low contrast portion from the display area enables the contrast to be improved.

The structure may be formed such that the light-non-transmitting layer and the light-transmitting layer are layered in this order on the inner surfaces of the pair of substrates. In this constitution, since the amount of display light absorbed at the light-transmitting layer is reduced, the amount of recycled light can be increased. Furthermore, with the structure formed by photolithography, a ridge portion is formed on a surface of the light-transmitting layer, and a disclination area is formed above the ridge portion, thereby reliably enabling the contrast to be improved.

The light-non-transmitting layer of the structure may be reflective. In this constitution, a light reflected on the light-non-transmitting layer is recycled, thereby enabling the luminance to be improved.

Furthermore, in a liquid crystal display according to the present invention, a liquid crystal display of transversal electric field type comprises a liquid crystal panel in which liquid crystal is retained between a pair of substrates, a plurality of scanning signal lines and a plurality of video signal lines formed so as to define a plurality of pixels in matrix on an inner surface of one of the pair of substrates, and a pixel electrode and a common electrode formed so as to be aligned in each pixel, wherein an image is displayed on the liquid display panel by inputting a video signal from the video signal line into the pixel electrode while sequentially selecting the pixel through the scanning signal line, characterized in that at least one of the scanning signal lines, the video signal lines, the pixel electrode, and the common electrode is partially constituted by a light-transmitting conductive layer and a light-non-transmitting conductive layer. In this constitution, luminance and contrast can be improved in the transversal electric field type.

A width of the light-transmitting conductive layer may be narrower than a width of the light-non-transmitting conductive layer.

The width of the light-non-transmitting conductive layer may be narrower than the width of the light-transmitting conductive layer by 1 μm or more. In this constitution, the luminance and the contrast can be suitably improved.

In the above case, the light-non-transmitting conductive layer and the light-transmitting conductive layer may be layered in this order on the inner surface of the substrate. In this constitution, since the amount of display light absorbed at the light-transmitting conductive layer is reduced, the amount of recycled light can be increased.

An electric conductivity of the light-non-transmitting conductive layer may be higher than an electric conductivity of the light-transmitting conductive layer. In this constitution, since a signal delay is reduced compared to the case where each of the scanning signal lines, the video signal lines, the pixel electrode, and the common electrode is entirely constituted by a light-transmitting electric conductor, flickering can be reduced.

The light-non-transmitting conductive layer may be constituted by a plurality of layers having a different reflectance, and a layer closest to the liquid crystal may have a lower reflectance than a layer closest to the substrate. In this constitution, since the amount of ambient light reflected on a surface of the liquid crystal side the light-non-transmitting conductive layer is reduced, the contrast can be improved.

The layer of the light-non-transmitting conductive layer closest to the liquid crystal may be constituted by an electric conductor having a higher reflectance than aluminum. In this constitution, the amount of recycled light is increased, thereby enabling the luminance to be improved.

A blackening process may be performed on a surface of the liquid crystal side of the light-non-transmitting conductive layer. In this constitution, since an ambient light is hardly reflected on a surface of the liquid crystal side of the light-non-transmitting conductive layer, the contrast can be suitably improved.

In the above case, a light-blocking layer may be formed on an inner surface of the other one of the pair of substrates so as to substantially overlap with the light-non-transmitting conductive layer when seen in a direction perpendicular to the liquid crystal panel. In this constitution, since an undesired light reflected on a surface of the light-non-transmitting conductive layer can be blocked, the contrast can be improved.

A blackening process may be performed on a surface of the liquid crystal side of the light-non-transmitting conductive layer. In this constitution, since an ambient light is hardly reflected on a surface of the liquid crystal side of the light-non-transmitting conductive layer, the contrast can be suitably improved.

In a liquid crystal display according to the present invention, a liquid crystal display of transversal electric field type may comprise a liquid crystal panel in which liquid crystal is retained between a pair of substrates, a plurality of scanning signal lines and a plurality of video signal lines formed so as to define a plurality of pixels in matrix on an inner surface of one of the pair of substrates, and a pixel electrode and a common electrode formed so as to be aligned in each pixel, wherein an image is displayed on the liquid display panel by inputting a video signal from the video signal line into the pixel electrode while sequentially selecting the pixel through the scanning signal line, characterized in that at least one of the scanning signal lines, the video signal lines, the pixel electrode, and the common electrode are partially constituted by a light-transmitting conductive layer and a light-non-transmitting conductive layer, and the other of the scanning signal lines, the video signal lines, the pixel electrode, and the common electrode, which are not constituted by a light-transmitting conductive layer and a light-non-transmitting conductive layer, have a light diffusive surface. In this constitution, since an ambient light diffused at the light diffusive upper surface can be used for a display light, a semi-transmittance liquid crystal display can be achieved. In addition, with the electrodes and the like constituted by a silver Ag-based material, the luminance can be further improved.

A light-blocking layer may be formed on an inner surface of the other one of the pair of substrates so as to substantially overlap with the scanning signal lines, the video signal lines, the pixel electrode, and the common electrode that have a light diffusive surface when seen in a direction perpendicular to the liquid crystal panel. In this constitution, since an ambient light diffused at the light diffusive upper surface and passing through an area above the electrodes and the like having a low modulation ratio can be blocked, the contrast can be improved.

The light-non-transmitting conductive layer may be constituted by an electric conductor having a higher reflectance than aluminum. In this constitution, the amount of recycled light and hence the luminance can be improved.

A liquid crystal display according to the present invention comprises an array substrate on an upper surface of which a common electrode, a pixel electrode, a scanning signal line, a video signal line, and a semiconductor switching device are formed, an opposing substrate disposed so as to be opposite to the upper surface of the array substrate, a liquid crystal panel having a liquid crystal layer disposed between the array substrate and the opposing substrate, and a reflecting face, wherein a light reflected on the reflecting face is transmitted through the liquid crystal panel, characterized in that at least one electrode of the common electrode and the pixel electrode is constituted by a electrode portion and a wiring portion, the electrode portion is at least partially constituted by a transparent electric conductor, the electrode portion is formed in a layer separated by an insulating layer from a layer in which the scanning signal line is formed, and the wiring portion is formed in the layer in which the scanning signal line is formed. In this constitution, since the electrode portion is at least partially constituted by a transparent electric conductor, the luminance is improved. Also, since the electrode portion of the electrode is separated by the insulating layer from the scanning signal line, short-circuit can be prevented.

The common electrode and the pixel electrode may be both constituted by a wiring portion and a comb-shaped electrode portion, and a width of the electrode portion at least partially constituted by a transparent electric conductor may be different from a width of the other part of the electrode portion. In this constitution, the width of the electrode portion constituted by a transparent electric conductor can be increased, thereby improving light-transmittance of the liquid crystal panel.

The width of the part of the electrode portion constituted by a transparent electric conductor may be larger than the width of the other part of the electrode portion. In this constitution, fabrication by use of photolithography can be simplified without reducing the light-transmittance of the liquid crystal panel.

In the above case, the common electrode and the pixel electrode may be both constituted by a wiring portion and a comb-shaped electrode portion, and widths of both of the common electrode portion and the pixel electrode portion may be such that liquid crystal molecules above an electrode portion constituted by a transparent electric conductor can be modulated by an electric field generated between both of the electrode portions. In this constitution, the light-transmittance can be improved without changing the driving system.

At least one of a width of each electrode portion of the common electrode and the pixel electrode and a spacing between both electrode portions of the common electrode and the pixel electrode may be substantially equal to or smaller than a spacing between the array substrate and the opposing substrate. In this constitution, since a vertical electric field is generated above the electrode portions, and an electric field strength above the electrode portions is increased, light-transmittance of portions where the electrode portions constituted by a transparent electric conductor in the liquid crystal panel is improved. Consequently, a liquid crystal display having a higher luminance can be obtained.

In the above case, a width of each electrode portion of the common electrode and the pixel electrode may be 1 μm or more and 10 μm or less. In this constitution, combined with other conditions, liquid crystal molecules above the electrodes can be suitably modulated.

A liquid crystal display according to the present invention comprises a liquid crystal panel having an array substrate on an upper surface of which a common electrode, a pixel electrode, a scanning signal line, a video signal line, and a semiconductor switching device are formed, an opposing substrate disposed so as to be opposite to the upper surface of the array substrate, a liquid crystal layer disposed between the array substrate and the opposing substrate and a reflecting face formed below the liquid crystal panel, wherein a light reflected on the reflecting face is transmitted through the liquid crystal panel, characterized in that at least one of the common electrode, the pixel electrode, the scanning signal line, the video signal line, and the semiconductor switching device is at least partially constituted by a high reflectance electric conductor having a higher reflectance than aluminum. Generally, a light reflected toward the reflecting face on the common electrode, the pixel electrode, the scanning signal line, the video signal line, and the semiconductor switching device is reflected on the reflecting face and recycled, part of which is transmitted through the liquid crystal panel, thereby contributing to the improvement of luminance of the liquid crystal panel. In this constitution, since at least part of members of the electrodes and the like is constituted by an high reflectance electric conductor having a higher reflectance than a commonly used aluminum, the amount of recycled light is increased by the amount of light reflected by the high reflectance electric conductor. Consequently, the light-transmittance of the liquid crystal panel is improved, and thereby a liquid crystal display having a high luminance can be obtained. Furthermore, unlike prior art cases where an entire part of the electrodes and the like is made to be transparent, the contrast is not reduced. Accordingly, a liquid crystal display having a high luminance and a high contrast can be obtained.

In the above case, the high reflectance electric conductor has a lower resistivity than aluminum, and at least one of the common electrode, the pixel electrode, the scanning signal line, and the video signal line is constituted by a single layer of the high reflectance electric conductor. In this constitution, since the high reflectance electric conductor has a lower resistivity than aluminum, members of the common electrode and the like can be formed with a single layer, thereby enabling manufacturing cost to be reduced compared to a case where multi layers are formed.

A liquid crystal display according to the present invention comprises a liquid crystal panel in which liquid crystal is retained between a pair of substrates, a plurality of scanning signal lines and a plurality of video signal lines formed so as to define a plurality of pixels in matrix on an inner surface of one of the pair of substrates, a pixel electrode formed in each pixel and a common electrode formed on an inner surface of the other one of the pair of substrates, wherein an image is displayed on the liquid display panel by inputting a video signal from the video signal line into the pixel electrode while sequentially selecting the pixel through the scanning signal line, characterized in that a high reflectance layer having a higher reflectance than aluminum is formed across an insulating layer and below at least one of the scanning signal lines, the video signal lines, and the pixel electrode. In this constitution, the amount of recycled light is increased, and thereby the luminance of the display screen can be improved in a TN-mode liquid crystal display.

A liquid crystal display of transversal electric field type according to the present invention comprises a liquid crystal panel in which liquid crystal is retained between a pair of substrates, a plurality of scanning signal lines and a plurality of video signal lines formed so as to define a plurality of pixels in matrix on an inner surface of one of the pair of substrates, and a pixel electrode and a common electrode formed so as to be aligned in each pixel, wherein an image is displayed on the liquid display panel by inputting a video signal from the video signal line into the pixel electrode while sequentially selecting the pixel through the scanning signal line, characterized in that a high reflectance layer having a higher reflectance than aluminum is formed being separated by an insulating layer from at least one of the scanning signal lines, the video signal lines, the pixel electrode, and the common electrode and therebelow. Also, in this constitution, the amount of recycled light is increased, and thereby the luminance of the display screen can be improved in a liquid crystal display of transversal electric field type.

The high reflectance layer may be formed to have substantially the same width as the scanning signal lines, the video signal lines, the pixel electrode, and the common electrode located above the high reflectance layer. In this constitution, since an area of the high reflectance layer can be maximized without the reduction of the luminance caused by the high reflectance layer appearing to protrude from the scanning signal lines and the like, the luminance can be effectively improved.

The high reflectance layer may be formed so as to substantially overlap with the scanning signal lines, the video signal lines, the pixel electrode, or the common electrode located above the high reflectance layer when seen in a direction perpendicular to the liquid crystal panel. Also, in this constitution, since an area of the high reflectance layer can be maximized without reducing the luminance caused by the high reflectance layer running off projections of the scanning signal lines and the like, the luminance can be effectively improved.

A liquid crystal display according to the present invention comprises an array substrate on an upper surface of which a common electrode, a pixel electrode, a scanning signal line, a video signal line, and a semiconductor switching device are formed, an opposing substrate disposed so as to be opposite to the upper surface of the array substrate, a liquid crystal panel having a liquid crystal layer disposed between the array substrate and the opposing substrate, and a reflecting face, wherein a light reflected on the reflecting face is transmitted through the liquid crystal panel, characterized in that at least one of the common electrode, the pixel electrode, the scanning signal line, the video signal line, and the semiconductor switching device has a plurality of layers which are non-transparent and having a different reflectance, and the plurality of layers are such that a layer closest to the liquid layer has a lower reflectance than a layer closest to the array substrate. In this constitution, since the amount of ambient light reflected by members of the common electrode and the like becomes relatively small compared to the amount of light recycled by the members of the common electrode and the like, reduction of the contrast due to an undesired light can be prevented.

The layer closest to the array substrate may be constituted by an electric conductor having a higher reflectance than aluminum. In this constitution, since the amount of recycled light is increased compared to prior art, a liquid crystal display having a high luminance can be obtained, while preventing reduction of the contrast due to an undesired light.

In the above case, one of the common electrode and the video signal line may be provided so as to overlap with one another with an insulating layer interposed therebetween when seen in a direction perpendicular to the array substrate. In this constitution, an aperture ratio of the array substrate can be increased, thereby achieving a liquid crystal display having a high luminance.

A light-blocking layer may be provided on the substrate on which the pixel electrode is formed. In this constitution, the accuracy of positioning of the light-blocking layer is determined by the accuracy of printing at a time of manufacturing, thereby suppressing decrease in the aperture ratio due to displacement in bonding the array substrate to the opposing substrate. Consequently, a liquid crystal panel having a high aperture ratio and a high luminance can be achieved.

A color filter may be provided on the substrate on which the pixel electrode is formed. In this constitution, the accuracy of positioning of color filter is determined by the accuracy of printing at a time of manufacturing, thereby suppressing decrease in the aperture ratio due to displacement in bonding the array substrate to the opposing substrate. Consequently, a liquid crystal panel having a high aperture ratio and a high luminance can be achieved.

A portion of the common electrode and a portion of the pixel electrode between which a substantially transversal electric field is generated are respectively formed so as to have at least one bent portion and at least one bent portion that are bent to conform in shape to one another in a pixel. In this constitution, a viewing angle characteristic can be further improved.

The liquid crystal display may comprise a light-blocking layer, wherein the video signal line and the light-blocking layer are formed so as to have bent portions bent to conform in shape to the bent portions of the common electrode and the pixel electrode when seen in a direction perpendicular to the array substrate. In this constitution, increase in light-blocking area can be prevented by bending each of the electrode portions of the electrodes.

In the above case, the semiconductor switching device may be constituted by a channel etching type thin film transistor. In this constitution, the insulating layer separating the electrode portions constituted by the transparent electric conductor from the scanning signal lines is constituted so as to also play a role as a protection layer for the channel etching type TFT, thereby enabling manufacturing process to be simplified. Consequently, an optimum constitution can be achieved with respect to manufacturing process.

The semiconductor switching device may be constituted by a thin film transistor using poly-silicon. In this constitution, the semiconductor switching device can be down-sized, thereby improving the aperture ratio of the array substrate. Consequently, a liquid crystal display having a high luminance can be obtained.

The higher reflectance than aluminum may be more than 90%. In this constitution, since the high reflectance electric conductor or the high reflectance layer has a higher reflectance than aluminum, a liquid crystal display having a higher light-transmittance and a higher luminance than prior art can be obtained.

The high reflectance electric conductor or the high reflectance layer may be made of an Ag-based material. In this constitution, since parts of members of the common electrode and the like are constituted by an Ag-based electric conductor having a higher reflectance than a commonly used aluminum, a reflectance of a portion constituted by the Ag-based electric conductor is increased, thereby increasing the amount of recycled light. Consequently, light-transmittance of the liquid crystal panel is improved, and thereby a liquid crystal display having a high luminance can be obtained.

The object, as well as other objects, features and advantages of the present invention will become more apparent to those skilled in the art from the following description of the preferred embodiments taken with reference to the accompanying drawings.

BRIEF DESCRIPTION OF THE DRAWINGS

FIGS. 1a and 1b are views showing a pixel structure of a liquid crystal display according to a first embodiment of the present invention, wherein FIG. 1a is a plan view, and FIG. 1b is a sectional view taken in the direction of arrows substantially along line Ib-Ib of FIG. 1a;

FIGS. 3a and 3b are views showing an operation of the liquid crystal display of FIGS. 1a and 1b, wherein FIG. 3a is a sectional view showing a pixel, and FIG. 3b is a partially enlarged sectional view showing a section of a counter electrode;

FIGS. 4a and 4b are views showing a pixel structure of a liquid crystal display according to a first modification of the first embodiment of the present invention, wherein FIG. 4a is a plan view, and FIG. 4b is a sectional view taken in the direction of arrows substantially along line IVb-IVb of FIG. 4a;

FIGS. 5a and 5b are views showing a pixel structure of a liquid crystal display according to a second modification of the first embodiment of the present invention, wherein FIG. 5a is a plan view, and FIG. 5b is a sectional view taken in the direction of arrows substantially along line Vb-Vb of FIG. 5a;

FIGS. 13a and 13b are views showing a constitution in a vicinity of pixel portion of the liquid crystal display of FIGS. 1a and 1b, wherein FIG. 13a is a plan view, and FIG. 13b is a sectional view taken in the direction of arrows substantially along line XIIIb-XIIIb of FIG. 13a;

FIGS. 16a and 16b are views showing a constitution in a vicinity of pixel portion of a liquid crystal display according to a ninth embodiment of the present invention, wherein FIG. 16a is a plan view, and FIG. 16b is a sectional view taken in the direction of arrows substantially along line XVIb-XVIb of FIG. 16a;

FIGS. 19a and 19b are views showing a constitution in a vicinity of pixel portion of a liquid crystal display according to an eleventh embodiment of the present invention, wherein FIG. 19a is a plan view, and FIG. 19b is a sectional view taken in the direction of arrows substantially along line XIXb-XIXb of FIG. 19a;

FIGS. 20a and 20b are views showing a constitution in a vicinity of pixel portion of a liquid crystal display according to a twelfth embodiment of the present invention, wherein FIG. 20a is a plan view, and FIG. 20b is a sectional view taken in the direction of arrows substantially along line XXb-XXb of FIG. 20a;

FIGS. 22a and 22b are views showing a constitution in a vicinity of pixel portion of a liquid crystal display according to a fourteenth embodiment of the present invention, wherein FIG. 22a is a plan view, and FIG. 22b is a sectional view taken in the direction of arrows substantially along line XXIIb-XXIIb of FIG. 22a;

FIGS. 26a and 26b are views showing an operation of the conventional liquid crystal display, wherein FIG. 26a is a sectional view showing an electric field and an alignment of liquid crystal molecules, and FIG. 26b is a sectional view showing a transmittance distribution.

BEST MODE FOR CARRYING OUT THE INVENTION

Hereinbelow, embodiments of the present invention will be described with reference to accompanying drawings.

First Embodiment

Figure 1:
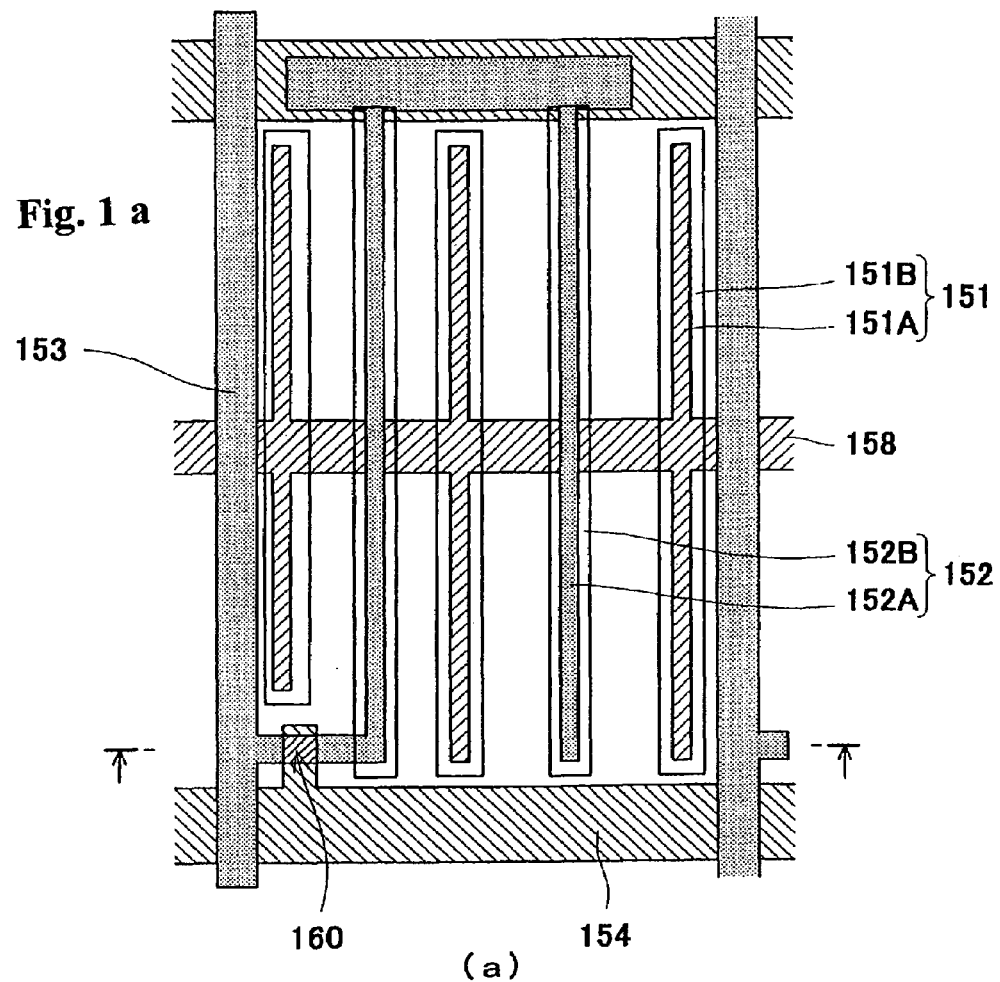
Figure 1:
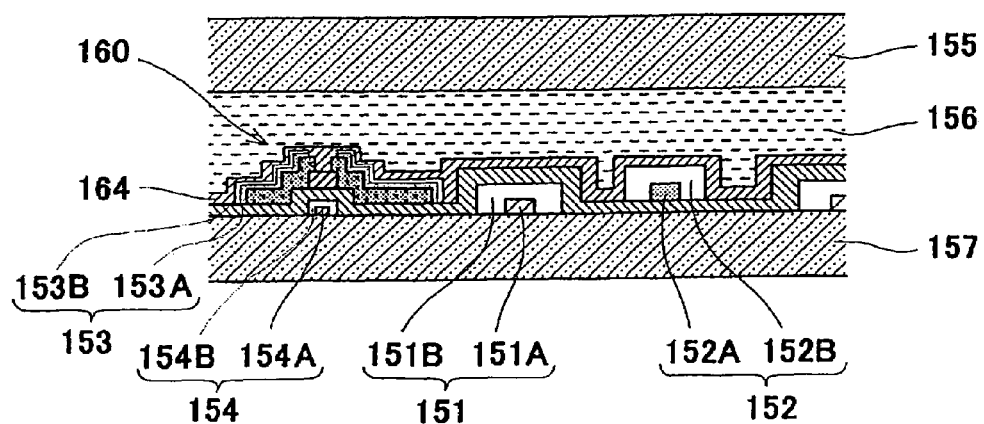

FIGS. 1a and 1b are views showing a pixel structure of a liquid crystal display according to a first embodiment of the present invention, wherein FIG. 1a is a plan view, and FIG. 1b is a sectional view taken in the direction of arrows substantially along line Ib-Ib of FIG. 1a.

In FIGS. 1a and 1b, the liquid crystal display according to the first embodiment includes a liquid crystal panel 101 having a display screen and a liquid crystal panel driving circuit (not shown) for displaying an image corresponding to a video signal on the display screen by modulating liquid crystal of the liquid crystal panel 101 in response to the video signal to change transmittance of a display light. In addition, the liquid crystal display is configured to be in a normally black mode.

As shown in FIGS. 1a and 1b, the liquid crystal display is constituted such that liquid crystal 156 is retained between an opposing substrate 155 and an array substrate 157, both of which are opposing to one another. The opposing substrate 155 and the array substrate 157 are both constituted by a glass substrate. A black matrix (hereinafter, referred to as a light-blocking layer (not shown)), color filter (not shown), and alignment layer are layered on an inner face of the opposing substrate 155 in this order. The substrate thus constituted is hereinafter referred to as an opposing side substrate. A plurality of video signal lines 153 which are in parallel with one another and a plurality of scanning signal lines 154 which are in parallel with one another, when seen in a plan view, are formed in an inner surface of the array substrate 157 so as to be orthogonal to one another and in matrix. A pixel (a display region) 103 is constituted by a region defined by the plurality of video signal lines 153 and the plurality of scanning signal lines 154. A mass of pixels 103 constitutes a display screen (not shown). A horseshoe-shaped pixel electrode 152 and a strip-shaped counter electrode (a common electrode) 151 are formed in each pixel 103 so as to oppose to one another. That is, the pixel electrode 152 and the counter electrode 151 are formed so as to oppose to one another in a comb-teeth shape. Then, both electrodes 152, 153 are formed so as to extend in parallel with the video signal lines 153. Also, one end of the pixel electrode 152 is connected to the video signal line 153 through a semiconductor switching element 160. The semiconductor switching element 160 is constituted by a channel etching type TFT (Thin Film Transistor). On the other hand, the counter electrode 151 is connected to a counter electrode bus line (a wiring portion) 158. Then, a protection film 164 is formed so as to cover a surface of the array substrate 157 in which these structures are formed, and further an alignment layer is formed so as to cover the protection film 164 (not shown). Hereinbelow, the substrate thus constructed is referred to as an array side substrate.

The counter electrode 151 is constituted by two layers including a non-transparent conductive layer 151A made of a metal having a high reflectance, for example, an Ag—Pd—Cu alloy having a reflectance of 98% in an visible light region and a transparent conductive layer 151B constituted by a transparent electric conductor, for example, ITO. That is, the counter electrode 151 is constituted such that the elongated plate-shaped non-transparent conductive layer 151A is formed on the array substrate 157, and the transparent conductive layer 151B is formed so as to cover a periphery of the non-transparent conductive layer 151A. Thus, in the counter electrode 151, when seen in a plan view, an edge portion thereof is constituted by the transparent conductive layer 151B, and a central portion thereof is constituted by the non-transparent conductive layer 151A.

Next, a fabrication method for the liquid crystal panel 101 thus constructed will be described with reference to FIGS. 1a, 1b, and FIG. 2. FIG. 2 is a sectional view showing process steps of the fabrication method of the liquid crystal panel 101.

First of all, a fabrication method of an array side substrate will be described. As shown in FIGS. 1a, 1b, and FIG. 2, in order to fabricate the array side substrate, a thin-film conductive layer made of an Ag—Pd—Cu alloy and having a film thickness of approximately 0.1 μm is formed on one main face of a glass substrate 157 serving as an array substrate using a vacuum forming machine.

Figure 2A:
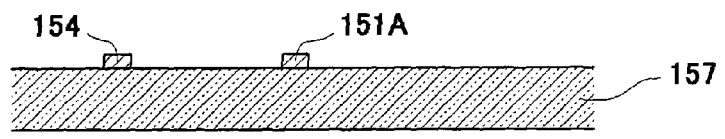
FIG. 2 is a sectional view showing process steps of a fabrication method of a liquid crystal panel 101.

Then, the scanning signal line 154, non-transparent conductive layer 151A of the counter electrode 151, and counter electrode bus line 158 are selectively formed by photolithography using a first photomask (FIG. 1a, FIG. 2a).

Figure 2B:
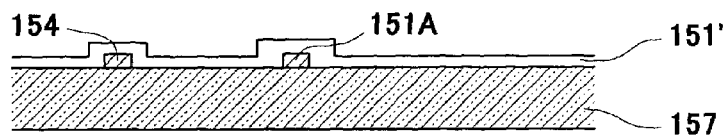

The, an ITO (Indium Tin Oxide) film 151' is formed by sputtering so as to be 0.04-0.2 μm in thickness (approximately 0.1 μm in the present embodiment) on an entire surface of the glass substrate 157 (FIG. 2b).

Figure 2C:
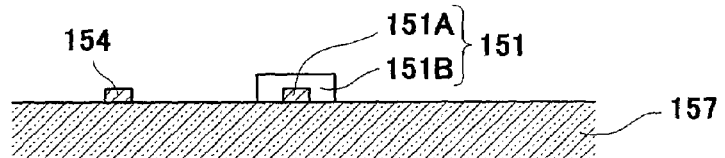

Thereafter, patterning is performed by photolithography using a second photomask such that a line width of the ITO film 151' should cover the non-transparent conductive layer 151A. In this way, a transparent conductive layer 151B is formed (FIG. 2c). In the present embodiment, the line width of the transparent conductive layer 151B is configured to be wider than that of the non-transparent conductive layer 151A by 1 μm or more on one side and 2 μm or more on both sides.

Figure 2D:
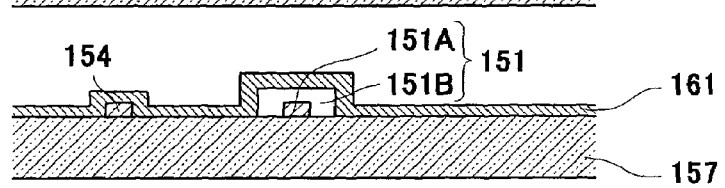
Figure 2E:
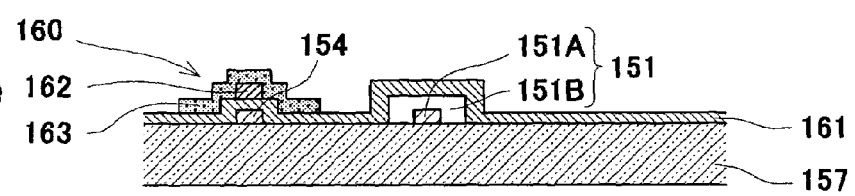

Then, using plasma CVD equipment, three kinds of thin-film layers including a silicon nitride SiNx layer to be a gate insulating layer of TFT 161, an amorphous silicon a-Si layer 162 containing little impurities to be a channel of TFT, and an N-type amorphous silicon n+a-Si layer 163 are sequentially formed on an entire surface of the glass substrate 157 so as to be respectively 0.3 μm, 0.2 μm, and 0.03 μm in thickness. Thereafter, the amorphous silicon a-Si layer 162 is selectively left on a portion to be the channel of TFT by using a third photomask, thereby forming a channel portion of TFT (FIGS. 2d, 2e).

Figure 2F:
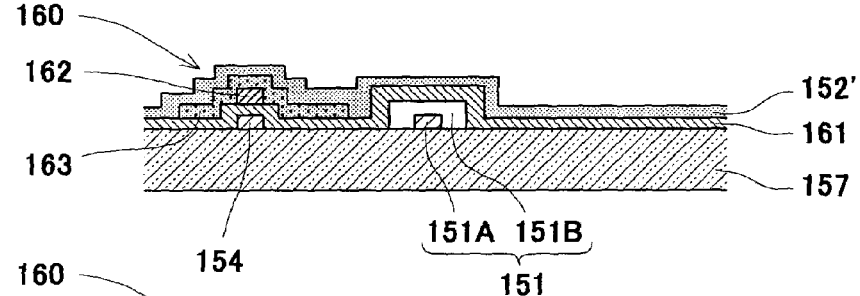

Then, a thin-film 152' made of an Ag—Pd—Cu alloy is formed by sputtering on an entire surface of the glass substrate 157 so as to be approximately 0.1 μm in thickness (FIG. 2f).

Thereafter, patterning is performed by photolithography using a fourth photomask on the thin-film 152' made of an Ag—Pd—Cu alloy, thereby selectively forming a video signal line 153 and a pixel electrode 152 (FIG. 1a).

Then, etching is performed on the N-type amorphous silicon n+a-Si layer 163 such that the N-type amorphous silicon n+a-Si layer 163 remains on a portion to be source and drain regions of the TFT. In this way, the TFT 160 using the channel etching type amorphous silicon is formed. It should be noted that, in the above process, the amorphous silicon a-Si layer 162 and the N-type amorphous silicon n+a-Si layer 163 can be laser-annealed to form a poly-silicon p-Si layer and a N-type poly-silicon n+p-Si layer respectively, thereby forming a TFT 160 using poly-silicon.

Figure 2G:
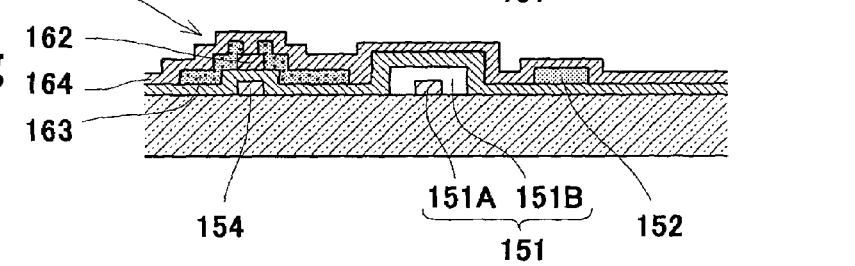

Then, using plasma CVD equipment, a protection film 164 constituted by a silicon nitride layer is deposited. Thereafter, an alignment layer is formed on the protection film 164 (FIG. 2g).

Finally, although not shown in the figures, for the purpose of supplying an electric signal to the scanning signal line 154 and the video signal line 153, the silicon nitride layer 164 serving as a passivation insulating layer on the electrodes is selectively removed in a periphery portion of the glass substrate 157 using a fifth photomask, thereby exposing terminal electrodes.

Next, a fabrication method for the opposing side substrate will be described. In this case, the light-blocking layer, color filter, and alignment layer are sequentially formed on one main surface of the glass substrate 155 serving as the opposing substrate. The light-blocking layer is formed so as to mask the scanning signal line 154 and video signal line 153 for light blocking.

Then, a liquid crystal panel 101 is assembled using a predetermined method in such a way that a liquid crystal 156 is retained in a gap between the opposing side substrate and the array side substrate.

Then, a liquid crystal panel driving circuit and a backlight are added, thereby completing the fabrication of the liquid crystal display.

Figure 3A:
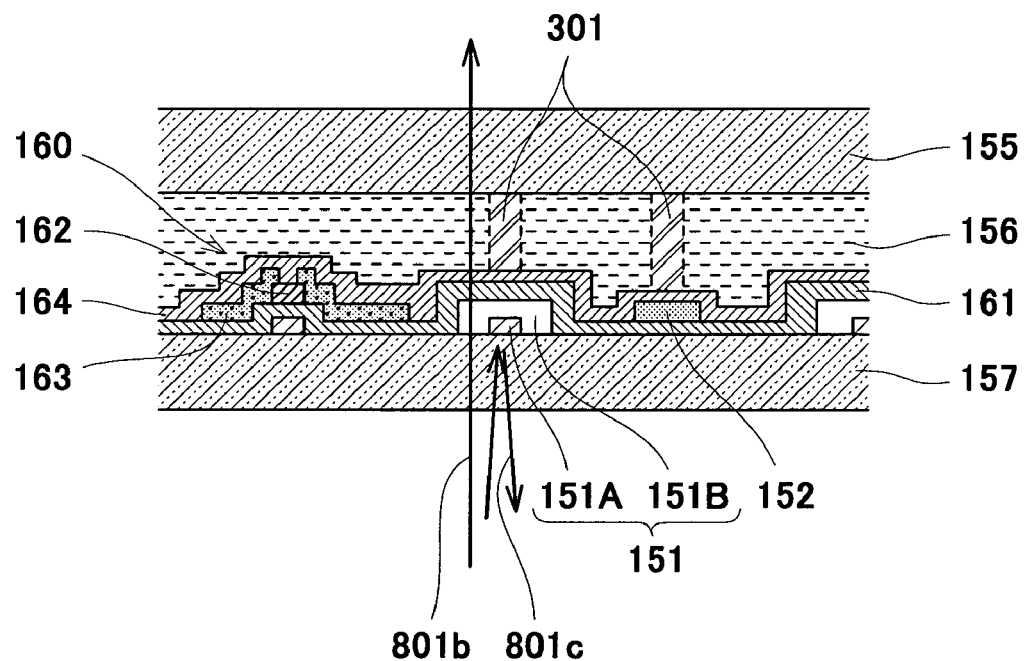
Figure 3B:
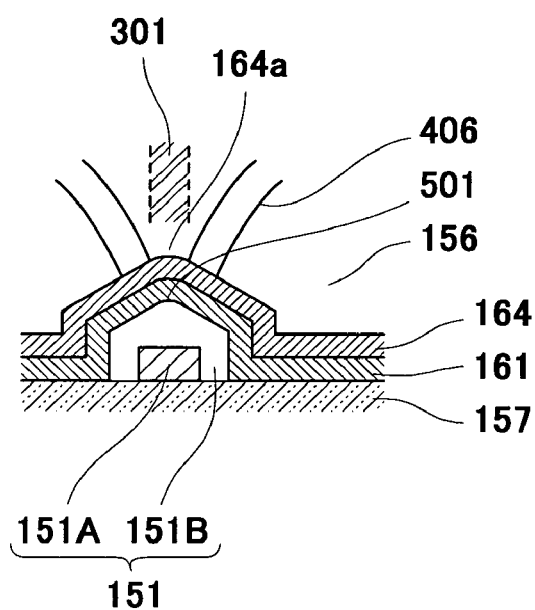

Next, operation of the liquid crystal display thus constituted and fabricated will be described. FIGS. 3a and 3b are views showing the operation of the liquid crystal display of FIGS. 1a and 1b, wherein FIG. 3a is a sectional view showing the pixel, and FIG. 3b is a partially enlarged sectional view showing the counter electrode.

As shown in FIG. 3a, in the liquid crystal display, when a voltage is applied across the pixel electrode 152 and the counter electrode 151, an electric field described in the prior art is formed between the pixel electrode 152 and the counter electrode 151 in response to the applied voltage, and a disclination area 301 is formed in a central portion of each of the electrodes 151, 152. Liquid crystal 156 in a pixel 103 is divided by the disclination area 301 into a plurality of domains 391. However, in the counter electrode 151, when seen in a plan view, an edge portion thereof is constituted by the transparent conductive layer 151B, and a central portion thereof is constituted by the non-transparent conductive layer 151A. Therefore, since a display light 801b which is incident on the transparent conductive layer 151B is transmitted therethrough, luminance of a display screen is improved correspondingly. On the other hand, since a display light 801c which is incident on the non-transparent conductive layer 151A is reflected on the non-transparent conductive layer 151A and returned back to a backlight, light recycling efficiency of the backlight is improved. In addition, since the disclination area 301 which is a low contrast area located above the non-transparent conductive layer 151A is removed from the display area, an average contrast of the display screen is improved correspondingly.

Furthermore, in the case similar to the present embodiment where the counter electrode 151 is a two-layer structure in which the non-transparent conductive layer 151A is covered by the transparent conductive layer 151B and formed by a method of photolithography, a ridge portion 501 is formed in an upper face of the outer layer 151B, and a ridge portion 164a reflecting the ridge portion 501 is also formed in a layer (an alignment layer not shown) contacting with the liquid crystal 156. Therefore, a boundary of lines of electric force 406 is formed in the ridge portion 164a, so that the disclination area 301 is formed above the ridge portion 164a. Consequently, the contrast can be reliably improved since the distination area 301 is reliably positioned above the non-transparent conductive layer 151A.

Furthermore, since the central portion of the counter electrode 151 is constituted by the non-transparent conductive layer 151A made of a silver Ag-based material having a high electrical conductivity, signal delay can be reduced compared to prior art in which the counter electrode 151 is constituted only by the transparent conductive layer made of ITO having a low electrical conductivity, thereby enabling flickering to be reduced.

Figure 4A:
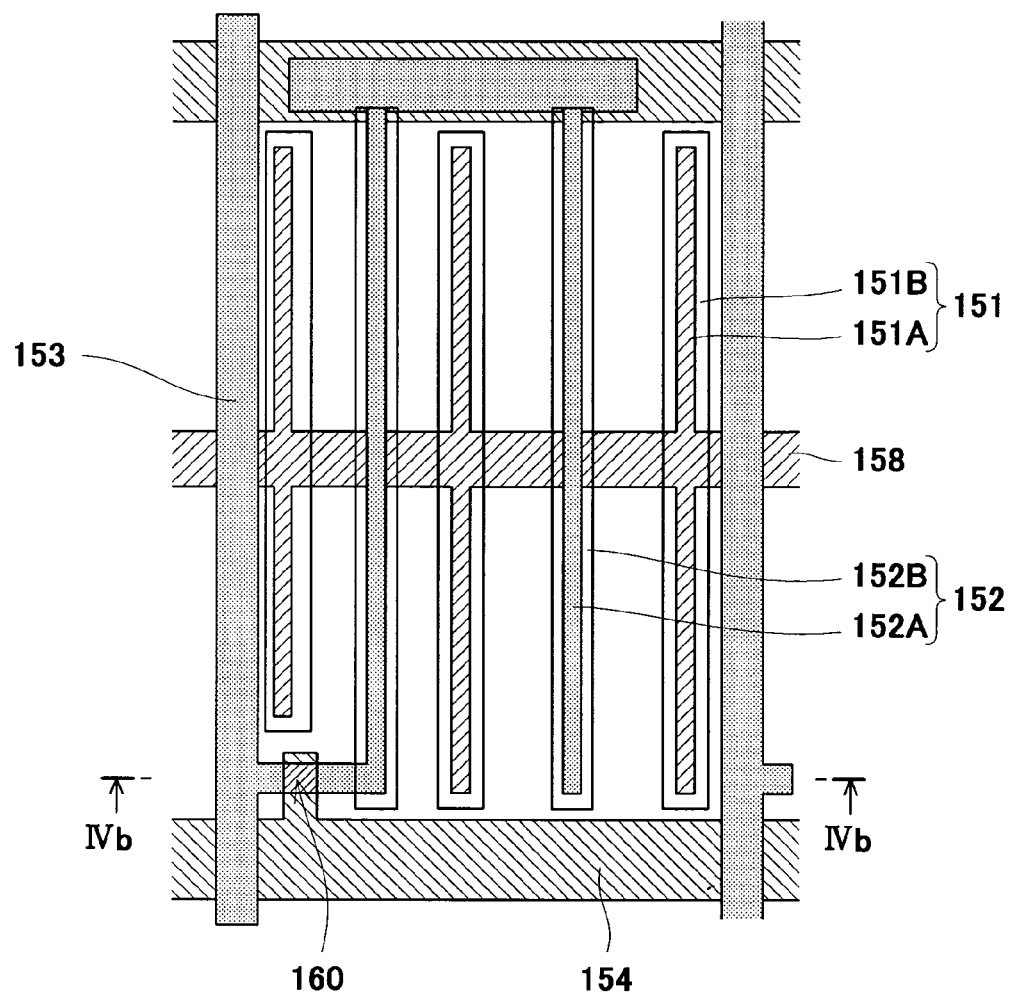
Figure 4B:
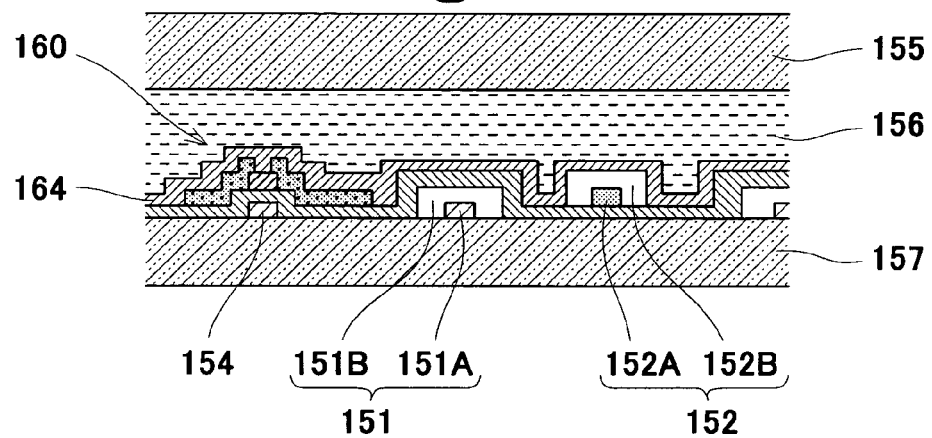

Next, an example of modification of the present embodiment will be described. FIGS. 4a and 4b are views showing a pixel structure of a liquid crystal display according to a first modification example, wherein FIG. 4a is a plan view, and FIG. 4b is a sectional view taken in the direction of arrows substantially along line IVb-IVb of FIG. 4a.

In the example of the present modification, in addition to the counter electrode 151, the pixel electrode 152 is also a two-layer structure including a non-transparent conductive layer 152A and a transparent conductive layer 152B, thereby enabling luminance and contrast of the display screen to be further improved. It should be noted that, of course, in the pixel electrode 152, similarly to the counter electrode 151, the ridge portion 164a shown in FIG. 3b is also formed, thereby allowing an effect in which the contrast of the display screen reliably is improved to be obtained.

Figure 5A:
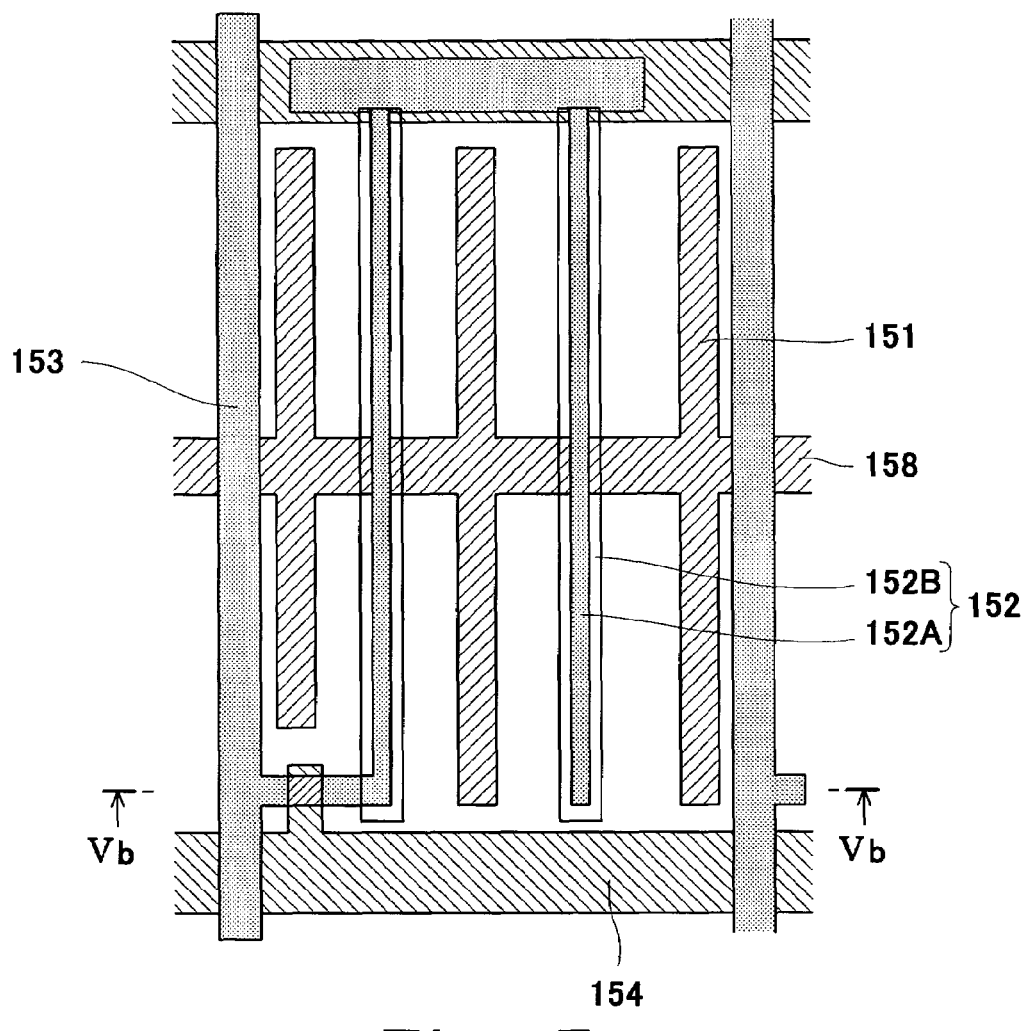
Figure 5B:
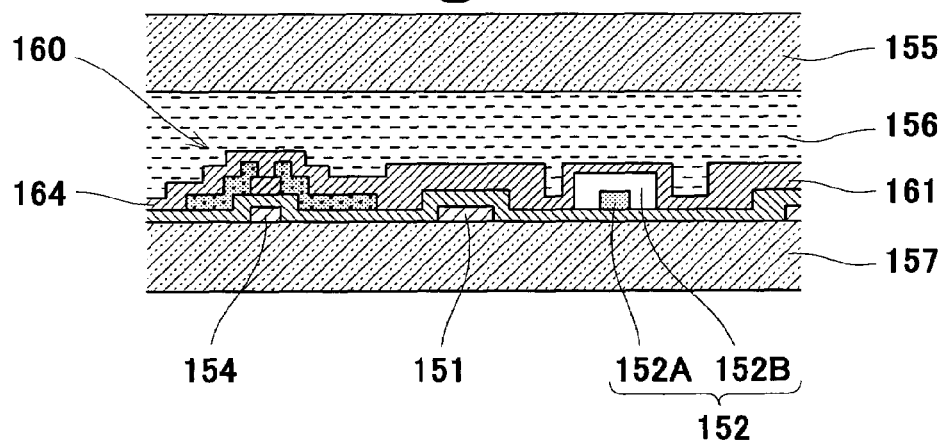

FIGS. 5a and 5b are views showing a pixel structure of a liquid crystal display according to a second modification example, wherein FIG. 5a is a plan view, and FIG. 5b is a sectional view taken in the direction of arrows substantially along line Vb-Vb of FIG. 5a.

In the example of the present modification, the pixel electrode 152 is a two-layer structure including the non-transparent conductive layer 152A and the transparent conductive layer 152B. Also, in this structure, the luminance and contrast of the display screen can be improved.

Figure 6:
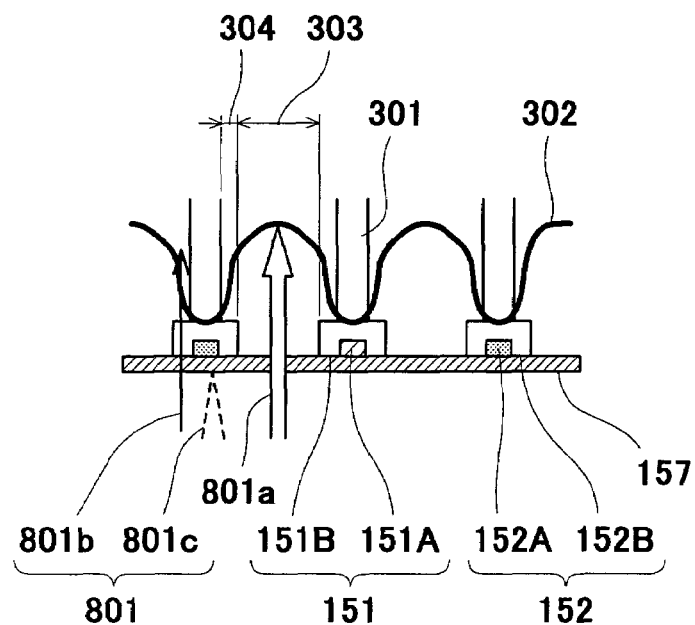
FIG. 6 is a sectional view showing a transmittance distribution of the liquid crystal display according to the first embodiment of the present invention.

Finally, effects of the present embodiment will be summarized for the sake of better clarification. FIG. 6 is a sectional view showing a transmittance distribution of the liquid crystal display according to the present embodiment.

Referring to FIG. 6, as shown in the examples of three constitution, at least one of the counter electrode 151 and the pixel electrode 152 of the liquid crystal display according to the present embodiment is a two-layer structure including a non-transparent conductive layer and a transparent conductive layer (FIG. 6 shows the case where both of the counter electrode 151 and the pixel electrode 152 are of two-layer structure). In this structure, when a voltage is applied across the counter electrode 151 and the pixel electrode 152, transmittance 302 becomes high in an area 303 located between the electrodes 151, 152 of liquid crystal, transmittance 302 becomes low in the disclination area 301, and transmittance 302 becomes medium in an area 304 located above a portion excluding the central portion of each of the electrodes 151, 152. As a result, of the display lights 801, a display light 801b which is incident on the area 304 having medium transmittance 302 as well as a display light 801b which is incident on the area 303 having high transmittance 302 is transmitted through the liquid crystal panel, and therefore, luminance of the display screen is correspondingly improved. On the other hand, of the display lights 801, a display light 801c which is incident on the disclination area 301 is reflected on the non-transparent conductive layer 151A, 152A of each of the electrodes 151, 152, and thus the disclination area 301 having low transmittance is removed from the display area. Consequently, an average contrast of the display screen is improved correspondingly.

While, in the examples of the constitutions, an inner portion of the pixel 103, that is, only electrodes located in the display area have a two-layer structure, the scanning signal line 154, video signal line 153, or the like may also have a two-layer structure.

Second Embodiment

In the first embodiment, the non-transparent conductive layer and the transparent conductive layer are formed using different photomasks. However, in the present embodiment, a transparent conductive layer is formed using the same mask as a photomask used to form a non-transparent conductive layer. In particular, in forming the non-transparent conductive layer, a line width of the non-transparent conductive layer is adjusted by over-etching so as to be smaller than a line width of the photomask in an etching process. Thereafter, in forming the transparent conductive layer, the degree of over-etching is adjusted in the etching process such that a line width of the transparent conductive layer is wider than the line width of the previously made non-transparent conductive layer. The degree of over-etching on the non-transparent conductive layer is the degree to which the line width of the non-transparent conductive layer becomes 2 μm narrower than the line width of the photomask.

With this forming method, an electrode constituted by two layers including a non-transparent conductive layer and a transparent conductive layer can be formed without increasing the number of photomasks.

Third Embodiment

Figure 7:
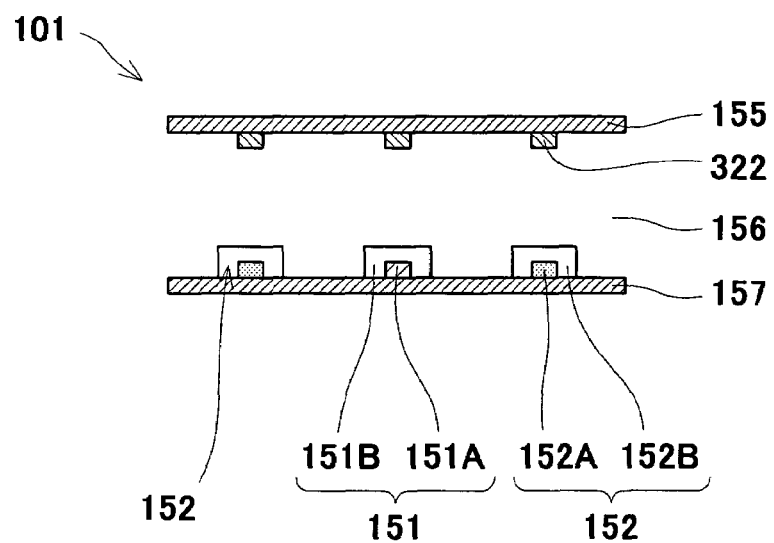
FIG. 7 is a sectional view schematically showing a constitution of a liquid crystal display according to a third embodiment of the present invention.

FIG. 7 is a sectional view schematically showing a constitution of a liquid crystal display according to a third embodiment of the present invention. In FIG. 7, the same reference numerals as in FIGS. 1a and 1b denote the same or corresponding elements.

As shown in FIG. 7, in the present embodiment, light-blocking layers 322 corresponding to the non-transparent conductive layers 151A, 152A of the counter electrode 151 and the pixel electrode 152 are formed on the opposing substrate 155. The light-blocking layers 322 are formed so as to overlap with the non-transparent conductive layers 151A, 152A when seen from a direction vertical to the liquid crystal panel 101. The other respects are similar to those of the first embodiment.

In this constitution, an ambient light incident from the opposing substrate 155 and reflected on the none-transparent conductive layers 151A, 152A, that is, an undesired light is reduced, thereby enabling the contrast of the display screen to be improved.

Furthermore, as an example of modification of the present embodiment, a blackening processed layer 376 may be formed on surfaces of the non-transparent conductive layers 151A, 152A of the counter electrode 151 and the pixel electrode 152, instead of providing the light-blocking layer 322. The blackening processed layer 376 is formed by forming a chromium layer having a low reflectance on the surfaces or by performing plasma treatment after forming a silver Ag-based material on the surfaces. In this constitution, an incident ambient light from the opposing substrate 155 side is absorbed by the blackening processed layer 376, thereby reducing an undesired light. Consequently, the contrast of the display screen can be improved.

Fourth Embodiment

A fourth embodiment of the present invention exemplifies a constitution of an IPS-mode semi-transmittance liquid crystal display.

Figure 8:
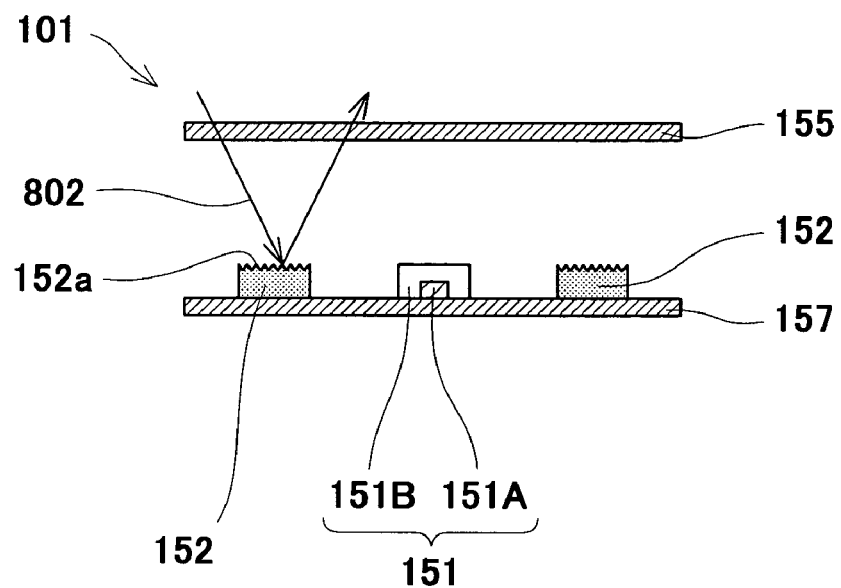
FIG. 8 is a sectional view schematically showing a constitution of a liquid crystal display according to a fourth embodiment of the present invention.

FIG. 8 is a sectional view schematically showing the constitution of the liquid crystal display according to the fourth embodiment. In FIG. 8, the same reference numerals as in FIGS. 1a and 1b denote the same or corresponding elements.

As shown in FIG. 8, in the present embodiment, either one of the counter electrode 151 and the pixel electrode (the pixel electrode in FIG. 8) is constituted by the non-transparent electric conductor, an upper face 152a of the electrode 152 constituted by the transparent electric conductor is formed to be light diffusive. The other respects are similar to those of the first embodiment.

In this constitution, since an incident ambient light 802 from the opposing substrate side is diffused at the light diffusive upper surface 152a, the diffused light can be used as a display light. Consequently, a semi-transmittance liquid crystal display can be achieved. Furthermore, if materials for the electrodes and the like can be constituted by silver Ag-based or the like metallic materials having a high reflectance, the luminance of the display screen can be improved.

Fifth Embodiment

Figure 9:
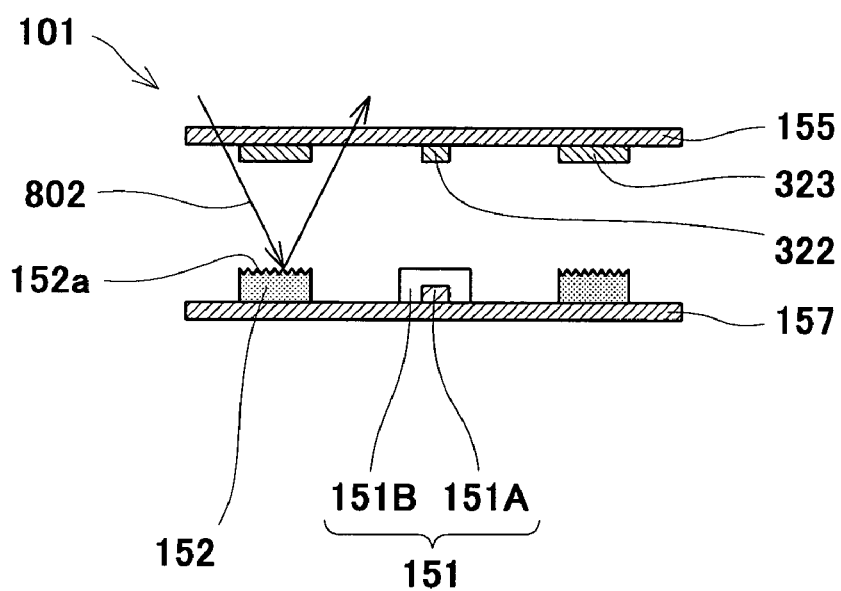
FIG. 9 is a sectional view schematically showing a constitution of a liquid crystal display according to a fifth embodiment of the present invention.

FIG. 9 is a sectional view schematically showing a constitution of a liquid crystal display according to a fifth embodiment of the present invention. In FIG. 9, the same reference numerals as in FIG. 8 denote the same or corresponding elements.

As shown in FIG. 9, according to the present embodiment, a light-blocking layer 323 is formed at a position on the opposing substrate 155 corresponding to the electrode 152 whose upper surface was formed to be light diffusive in the liquid crystal display of the fourth embodiment. In this constitution, among lights reflected on the upper surface 152a of the electrode 152, an undesired light incident on an observer's eye through a liquid crystal layer having a low modulation ratio and located above the electrode 152 can be reduced, thereby further improving the contrast of the display screen.

Sixth Embodiment

Figure 10:
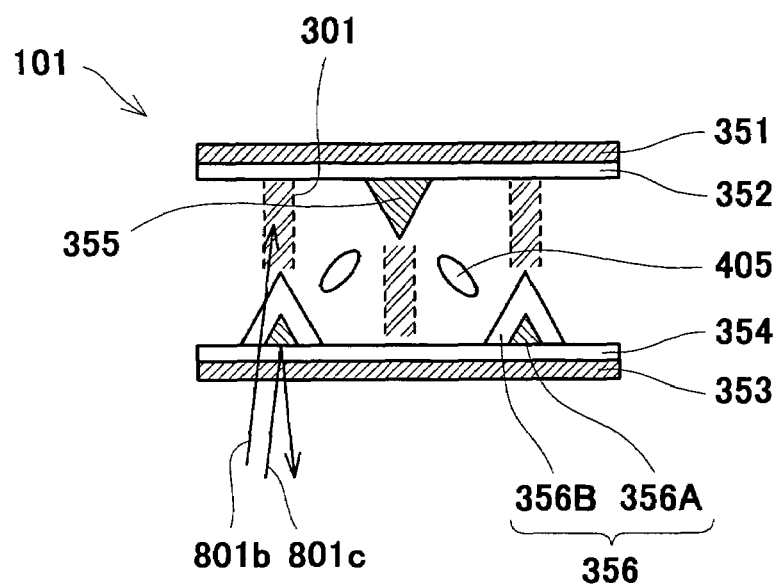
FIG. 10 is a sectional view schematically showing a constitution of a liquid crystal display according to a sixth embodiment of the present invention.

FIG. 10 is a sectional view schematically showing a liquid crystal display according to a sixth embodiment of the present invention.

As shown in FIG. 10, in the present embodiment, the present invention is applied to a so-called MVA (Multi-domain Vertical Alignment)-mode liquid crystal display. That is, according to a liquid crystal panel 101 in the liquid crystal display 101 of the present embodiment, transparent electrodes made of ITO are respectively formed on inner surfaces of an opposing substrate 351 and an array substrate 353 in a pixel, and ribs having a triangular-shaped section are formed on surfaces of each of the transparent electrodes so as to protrude alternately from the opposing substrate 351 side and the array substrate 353 side. The rib 355 formed on the opposing substrate 351 side is made of dielectric substance similarly to prior art. On the other hand, the rib 356 formed in the array substrate 353 side is constituted by two layers including a non-transparent conductive layer 356A formed on a transparent electrode 354 and a transparent dielectric layer 356B formed so as to cover the non-transparent conductive layer 356A. The non-transparent layer 356 is made of conductive material having a high reflectance. In the liquid crystal display thus constituted, liquid crystal molecules 405 are oriented obliquely due to an action of the dielectric substances of the ribs 355, 356. As a result, a disclination area 301 is formed in a ridge portion of the rib 355, 356, and this disclination area is a low contrast area having a low transmittance (modulation) similarly to the case of the IPS-mode. However, in the present embodiment, the rib 356 in the array substrate 353 side is constituted such that the non-transparent conductive layer 356A is positioned below the ridge. Therefore, a display light 801b incident on the transparent dielectric layer 356B passes through this, thereby correspondingly improving the luminance of the display screen. On the other hand, a display light 801c incident on the non-transparent conductive layer 356A is reflected on the non-transparent conductive layer 356A and returned back to a backlight, thereby improving light recycling efficiency of the backlight and excluding the disclination area 301 located above the non-transparent conductive layer 356A from the display area. Consequently, an average contrast of the display screen is improved correspondingly.

It should be noted that the rib 355 on the opposing substrate 351 side may be of a two-layer structure including a non-transparent conductive layer and a transparent dielectric layer.

In addition, although, in the above-mentioned constitution, the non-transparent layer of the two-layer structure is constituted by an electric conductor, since the non-transparent layer only needs to have a light reflectance, the non-transparent layer may be constituted by a dielectric substance or a semiconductor having a light reflectance.

Seventh Embodiment

Figure 11:
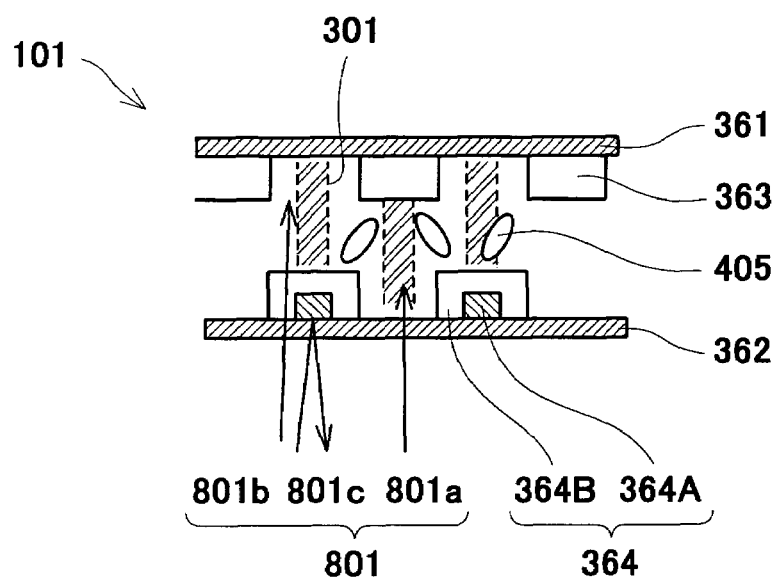
FIG. 11 is a sectional view schematically showing a constitution of a liquid crystal display according to a seventh embodiment of the present invention.

FIG. 11 is a sectional view schematically showing a constitution of a liquid crystal display according to a seventh embodiment of the present invention.

As shown in FIG. 11, in the seventh embodiment, the present invention is applied to a so-called PVA (Patterned Vertical Alignment)-mode liquid crystal display. That is, in a liquid crystal panel 101 of a liquid crystal display according to the present embodiment, electrodes are respectively formed on inner surfaces of an opposing substrate 361 and an array substrate 362 so as to protrude alternately from the opposing substrate 361 side and the array substrate 362 side in a pixel. The electrode 363 formed in the opposing substrate 361 side is constituted by a transparent electric conductor made of ITO, similarly to prior art. On the other hand, the electrode 364 formed in the array substrate 353 side is constituted by two layers including a non-transparent conductive layer 364A formed on the array substrate 362 and a transparent conductive layer 364B made of ITO formed so as to cover the non-transparent conductive layer 364A. The non-transparent conductive layer 364 is made of conductive material having a high reflectance. In the liquid crystal display thus constituted, an electric field is formed obliquely between the electrode 363 in the opposing substrate 361 side and the electrode 364 in the array substrate 362 side, and liquid crystal molecules 405 are oriented obliquely according to the electric field. As a result, a disclination area 301 is formed in a central portion of each electrode 363, 364, and this disclination area 301 is a low contrast area having a low transmittance (modulation), similar to the case of IPS-mode. However, in the present embodiment, the electrode 364 in the array substrate 362 side is constituted such that the non-transparent conductive layer 364A is positioned in the central portion. Therefore, a display light 801b incident on the transparent conductive layer 364B passes through this, thereby correspondingly improving the luminance of the display screen. On the other hand, a display light 801c incident on the non-transparent conductive layer 364A is reflected on the non-transparent conductive layer 364A and returned back to a backlight, thereby improving light recycling efficiency of the backlight and excluding the disclination area 301 located above the non-transparent conductive layer 364A from the display area. Consequently, an average contrast of the display screen is improved correspondingly.

It should be noted that the electrode 368 on the opposing substrate 361 side may be of a two-layer structure including a non-transparent conductive layer and a transparent dielectric layer.

Eighth Embodiment

Figure 12:
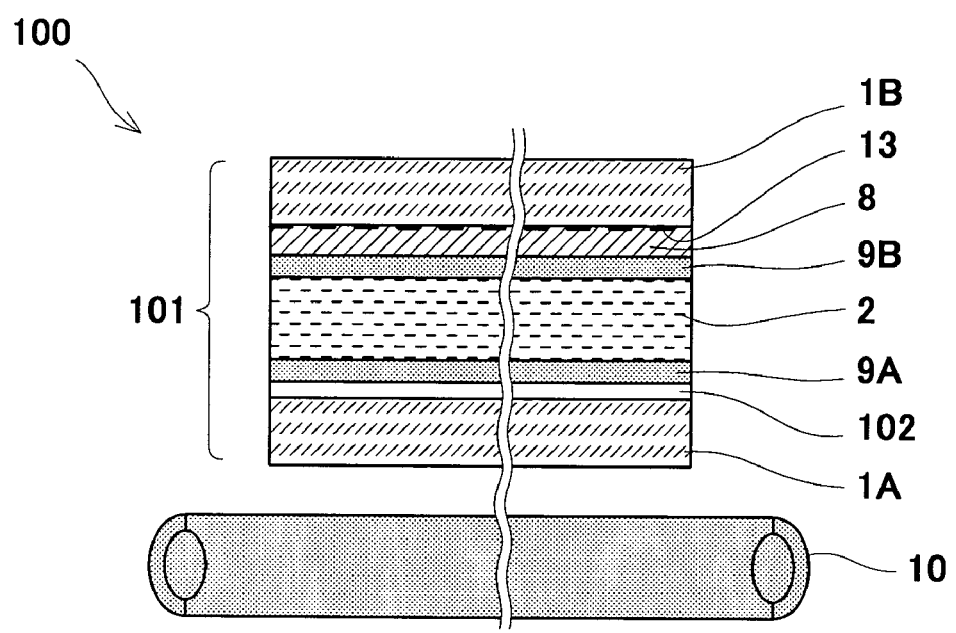
FIG. 12 is a sectional view schematically showing a constitution of a liquid crystal display according to an eighth embodiment of the present invention.

FIG. 12 is a view schematically showing a constitution of a liquid crystal display according to an eighth embodiment of the present invention. FIGS. 13a and 13b are views showing a constitution in the vicinity of a pixel in a liquid crystal display of FIG. 12, wherein FIG. 13a is a plan view, and FIG. 13b is a sectional view taken in the direction of arrows substantially along line XIIIb-XIIIb of FIG. 13a. The direction of the liquid crystal display is defined as shown in FIG. 12 for the sake of convenience.

As shown in FIG. 12, the liquid crystal display 100 includes a liquid crystal panel 101 and a backlight 10, the backlight 10 being disposed directly below the liquid crystal panel 101.

As shown in FIG. 12 and FIGS. 13a and 13b, in the liquid crystal panel 101, an opposing substrate 1B is located so as to be opposite to an upper surface of an array substrate 1A, and liquid crystal is located between both substrates 1A, 1B. A wiring layer 102 is formed on the upper surface of the array substrate 1A. In addition, an alignment layer 9A is formed so as to cover the upper layer of the array substrate 1A on which the wiring layer was formed. In addition, a light-blocking layer 13 having a grid or stripe shape is formed on a lower surface of the opposing substrate 1B, and a color filter 8 is formed so as to cover the lower surface of the opposing substrate 1B on which the light-blocking layer 13 was formed. Furthermore, an alignment layer 9B is formed so as to cover a lower layer of the color filter 8. Then, the liquid crystal 2 is located between the alignment layer 9A formed on the array substrate 1A and the alignment layer 9B formed on the opposing substrate 1B. In addition, polarizing films (not shown) are respectively provided on the lower surface of the array substrate 1A and the upper surface of the opposing substrate.

A backlight 10 includes a light guiding plate 10b, a reflecting plate (reflecting surface) 10c, and a light source 10a. The light guiding plate 10b is provided below the liquid crystal panel 101. A pair of tubular light sources 10a are provided along a pair of opposing side faces of the light guiding plate 10b. The reflector 10c is provided so as to cover other side faces and a lower surface of the light guiding plate 10b. Furthermore, a lamp reflector (not shown) is provided so as to cover a periphery of the light source 10a excluding a portion thereof facing the light guiding plate 10b, and a diffusive sheet (not shown) for diffusing light is provided on the upper surface of the light guiding plate 10b.

Next, the above-mentioned wiring layer 102 will be described in detail. An electric circuit for changing the alignment of liquid crystal 2 (hereinafter, referred to as a liquid crystal operation circuit) is constituted by a load portion and a power supply portion. The load portion is constituted by a portion formed within the wiring layer of the liquid crystal panel 101, and the power supply portion is constituted by a so-called liquid crystal panel drive circuit. The liquid crystal panel drive circuit is not shown. Circuit components (hereinafter, referred to as in-panel liquid crystal operation circuit components) such as a common electrode 3, a pixel electrode 4, and the like are formed in the wiring layer 102 as the load portion of the liquid crystal operation circuit.

As shown in FIG. 13a, a common electrode 3, a pixel electrode 4, a video signal line 5, a scanning signal line 6, and a semiconductor switching device 7 are formed on the array substrate 1 as the in-panel liquid crystal operation circuit components.

In a plan view, the video signal line 5 and the scanning signal line 6 are respectively formed linearly, and a plurality of video signal lines 5 and a plurality of scanning signal lines 6 are orthogonal and provided on the array substrate 1A so as to be in matrix. An area defined by the video signal lines 5 and the scanning signal lines 6 constitutes a pixel 103. In each pixel 103, the common electrode 3 and the pixel electrode 4 are both formed to be string-shaped (strip-shaped to be more accurate) and constituted by electrode portions 3a, 4a functioning practically as an electrode by generating a transversal electric field and wiring portions 3b, 4b', 4b'' functioning as a wire connecting the electrode portions with each other and the electrode portions with other in-panel liquid crystal operation circuit components. The common electrode 3, in the present embodiment, is provided such that three electrode portions 3a having a certain length are bent in a zigzag at certain intervals and extend in an extending direction of the video signal line 5, and the wiring portion 3b is provided so as to linearly extend in an extending direction of the scanning signal line 6, connecting central portions of each electrode portion 3a. The wiring portion 3b is connected to an earth terminal not shown. The pixel electrode 4 is, in the present embodiment, provided such that two electrode portions 4a extend in an extending direction of the video signal line 5 and between the three electrode portions 3a of the common electrode 3 so as to be bent in a zigzag and so as to conform in shape to the electrode portions 3a of the common electrode 3. The electrode portions 4a of the pixel electrode 4 and the electrode portions 3a of the common electrode 3 are evenly spaced with each other. One ends of the electrode portions 4a are connected by means of the wiring portion 4b' located on the scanning signal line 6, and the other end of one electrode portion 4a is connected to the semiconductor switching device 7 by means of the L-shaped wiring portion 4b". The semiconductor switching device 7 is provided in the vicinity of an intersection of the video signal line 5 and the scanning signal line 6 for each pixel. The semiconductor switching device 7 is constituted by a well-known TFT, a gate electrode is connected to the scanning signal line 6, a source is connected to the video signal line 5, and a drain is connected to the wiring portion 4b" of the pixel electrode 4.

Additionally, the wiring layer 102 is, in a sectional view, formed on the array substrate 1 by layering the common electrode 3 and the scanning signal line 6, the insulating layer (not shown), and the pixel electrode 4, and the video signal line 5 in this order and from the bottom up. It should be noted that FIG. 13b illustrates the common electrode 3 and the pixel electrode 4 as being in the same layer for the sake of simple description.

Next, materials will be described. The array substrate 1A and the opposing substrate 1B are made of transparent glass. The alignment layer 9A, 9B is made of material capable of aligning molecules of the liquid crystal 2 such as polyimide. The semiconductor switching device 7 is made of amorphous silicon a-Si used for an active semiconductor layer.

The common electrode 3, the pixel electrode 4, the video signal line 5, and the scanning signal line 6 are made of Ag-based metallic materials having a high reflectance of substantially 95% or more in the visible light region (hereinafter, referred to as high reflectance metallic materials). Of such metallic materials, an Ag—Pd—Cu alloy is preferable in consideration of etching performance and reliability required for patterning in photolithography. Since Ag-based metallic materials have a low electric resistivity, the use of an Ag—Pd—Cu alloy enables the in-panel liquid crystal operation circuit components to be constituted by a single layer, thereby reducing the manufacturing cost in comparison with the use of multi-layers of Al-based, Cr-based, etc. metallic materials. Furthermore, owing to the low electric resistivity, a layer thickness of the in-panel liquid crystal operation circuit components can be reduced, thereby enabling the alignment to be reliably formed. Consequently, a liquid crystal display having high picture qualities such as high contrast and low uneven luminance can be achieved. In the present embodiment, an Ag—Pd—Cu alloy is used as a high reflectance metallic material. The composition ratio is Ag:Pd:Cu=0.981: 0.009:0.010.

Figure 13:
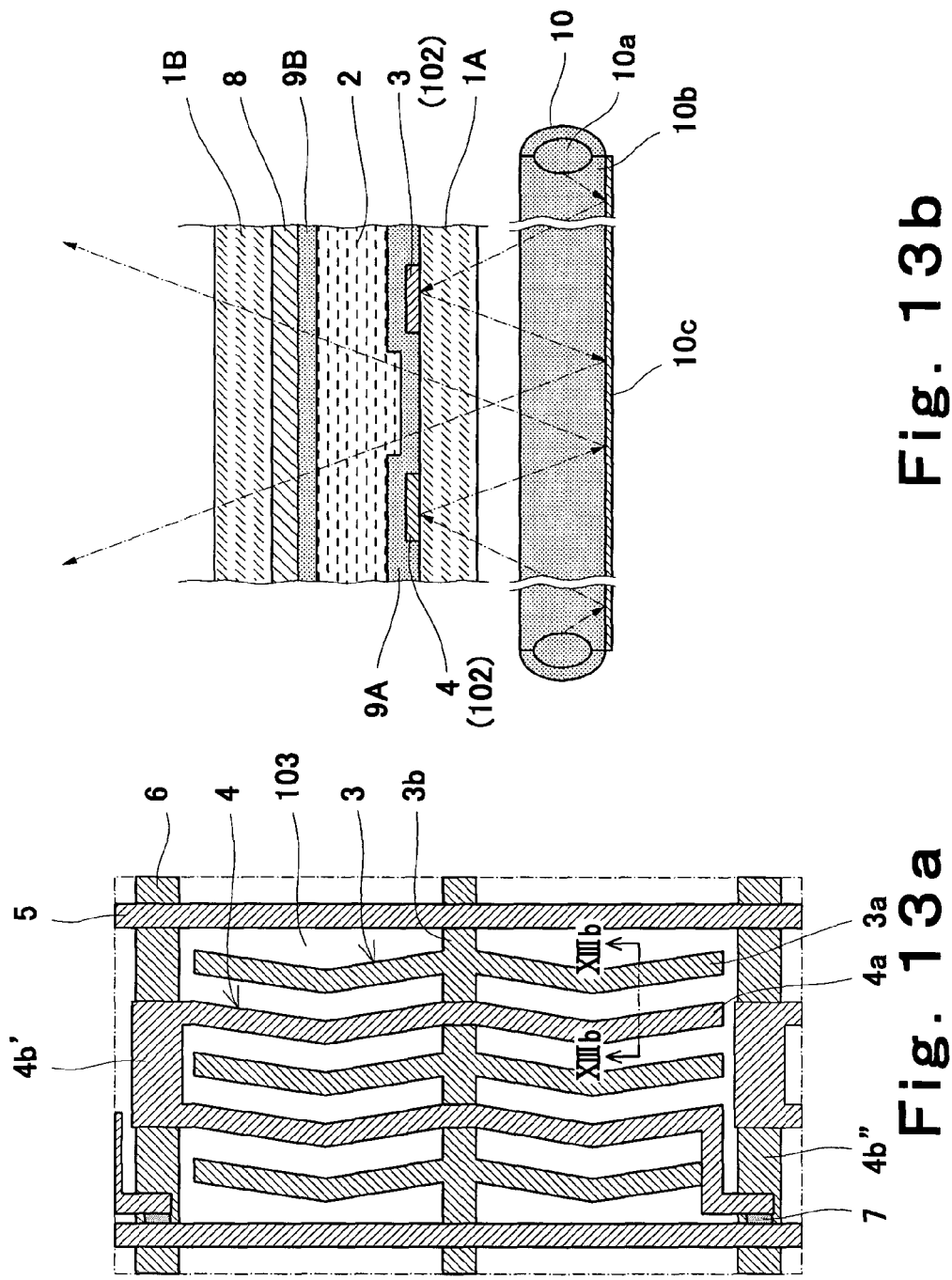

Next, a fabrication method for the liquid crystal display thus constituted will be described. In FIGS. 12 and 13, first of all, a conductive layer made of high reflectance metallic material is formed on an array substrate 1A, and a common electrode 3 and a scanning electrode line 6 are formed by patterning the conductive layer. Then, an insulating layer (not shown) is formed so as to cover a surface of the common electrode 3 and the scanning electrode line 6. Thereafter, a semiconductor switching device 7 is formed of amorphous silicon a-Si or the like, a conductive layer made of high reflectance metallic material is formed, and a pixel electrode 4 and a video signal line 5 are formed by patterning the conductive layer.

Then, an alignment layer 9A made of polyimide is formed on a surface of the array substrate 1 on which the pixel electrode 4 and the video signal line 5 were formed.

On the other hand, a light-blocking layer 102 and a color filter 8 are sequentially formed on an opposing substrate 1B. In the color filter 8, color filter materials of R (red), G (green), and B (blue) are arranged in a predetermined pattern. Then, an alignment layer 9B made of polyimide is formed on a surface of the opposing substrate 1B on which the color filter 8 was formed.

Then, initial alignments are respectively developed in predetermined directions in the array substrate 1A and the opposing substrate 1B thus constructed. Then, peripheral portions of the array substrate 1A and the opposing substrate 1B are bonded together using a sealing agent, and thereafter a space formed between both substrates is filled with liquid crystal 2 and then sealed, thus completing a liquid crystal panel 101. Thereafter, a backlight 10 is mounted to the liquid crystal panel 101.

Next, operation of the liquid crystal display 100 thus constituted will be described. In FIG. 13, the semiconductor switching device 7 is controlled for on/off according to a driving signal inputted through the video signal line 5 and the scanning signal line 6. Then, a voltage is applied across the pixel electrode 4 and the common electrode 3 depending on the control state of the semiconductor switching device 7, thereby causing a transversal electric field to be generated. The alignment of the liquid crystal 2 varies according to the generated transversal electric field, and transmittance of an incident light from the backlight 10 varies according to the variation, thereby controlling the luminance of each pixel 103 for an image display.

By the way, generally, in a display method using an IPS-mode, since the common electrode 3 and the pixel electrode 4 are formed to be lined up side-by-side on the array substrate 1A, an aperture ratio of the array substrate 1A is reduced to 30-40%. On the other hand, a light emanating from the light source 10a of the backlight 10 is repeatedly reflected on the reflector 10c and the like and reaches to the array substrate 1A through the light guiding plate 10b. Only part of the light is transmitted through an aperture of the array substrate 1A, that is, through a portion of the array substrate 1A where the in-panel liquid crystal operation circuit components such as the common electrode 3, the pixel electrode 4, and the like are not formed. However, the other part of the light, after reflected on the in-panel liquid crystal operation circuit components, is repeatedly reflected within the backlight 10 and the array substrate 1A, during which part of the other part of the light is sequentially transmitted through the aperture. That is, even light unable to be transmitted through the aperture of the array substrate 1A is recycled when reflected toward the reflecting plate 10c, and part of the recycled light is transmitted through the aperture, thereby contributing to improvement of the luminance of the liquid crystal panel 101.

In FIG. 13b, dashed lines having arrows show a light tracking view illustrating a state in which a light emanating from the light source 10a is reflected on the reflecting plate 10c, traveling toward the array substrate 1A, then reflected on the common electrode 3 and the pixel electrode 4, thereafter returning back to the backlight 10, reflected again on the reflecting plate 10c, then further traveling toward the array substrate 1A, and finally transmitted through the aperture. A light transmitted through the aperture of the array substrate 1A after repeatedly reflected in the manner described above is defined as a recycled light. Therefore, the amount of recycled light increases or decreases depending on the reflectance of each component constituting the liquid crystal panel 101 and backlight 10, the transmittance of the liquid crystal panel 101, and the number of reflections.

In a conventional liquid crystal display, metallic materials for use in the in-panel liquid crystal operation circuit components have hardly been selected in view of these respects. Rather, in view of cost, or etching performance, reliability, or the like, Cr-based or Al-based alloys, or a multi-layer wiring formed by combining these alloys with metal such as Ti, Zr, Mo, or the like has been frequently used.

However, these metallic materials do not have a high reflectance, and, especially, a Cr-based alloy has a low reflectance of approximately 60%. Therefore, a light emanating from the light source 10a of the backlight 10 loses a large amount of light by being repeatedly reflected on the in-panel liquid crystal operation circuit components. Accordingly, the amount of light to be used as a recycled light is small, and the recycled light could hardly contribute to the improvement of the luminance. Therefore, in a conventional IPS-mode liquid crystal display, decrease in aperture ratio of the array substrate directly lead to the reduction of the luminance of the liquid crystal panel, thereby making the screen dark.

In contrast, the present invention pays attention to the fact that recycled light contributes to the improvement of the luminance. In the liquid crystal display according to the present embodiment, metallic materials having a high reflectance are used as materials for in-panel liquid crystal operation circuit components. Accordingly, since the amount of light to be lost while a light emanating from a light source 10a of the backlight is repeatedly reflected between the backlight 10 side and the array substrate 1A side or within the liquid crystal panel 101 can be reduced, the amount of light that can be used as recycled light is increased, thereby enabling the recycled light to contribute to the improvement of the luminance. Consequently, a liquid crystal display having a high luminance can be obtained. In addition, differently from prior art, where the entire part of the electrodes was made transparent, the reduction of the contrast is not brought about. Consequently, a liquid crystal display having a high luminance and a high contrast can be achieved.

By the way, the backlight 10 is actually constituted by a diffusive sheet, a collecting prism, a polarization conversion film, and the like, as well as the light source 10a, the light guiding plate 10b, and the reflector 10c and thus very complicated. And, this constitution also depends on the model. For the purpose of analyzing the influence of reflectance of the common electrode 3 and the pixel electrode 4, two kinds of backlights having different constitutions are selected, and, for the two kinds of backlights, a rate (hereinafter, referred to as a recycling rate) was actually measured between the amount of light returned to the backlight 10 side and the amount of light returned to the backlight 10 side, reflected, and again incident on the liquid crystal panel 101. As a result, the recycling rates of the two kinds of backlights were different and approximately 60% and 90%, respectively. Hereinbelow, by comparing these two backlights, influences of reflectance of the common electrode 3 and the pixel electrode 4 (hereinafter, simply referred to as electrodes) on the amount of recycled light are examined. Here, the amount of recycled light is represented as a rate expressed in % of the amount of light emanating from the light source 10a of the backlight 10 to the amount of light transmitted through the array substrate 1A.

Figure 14:
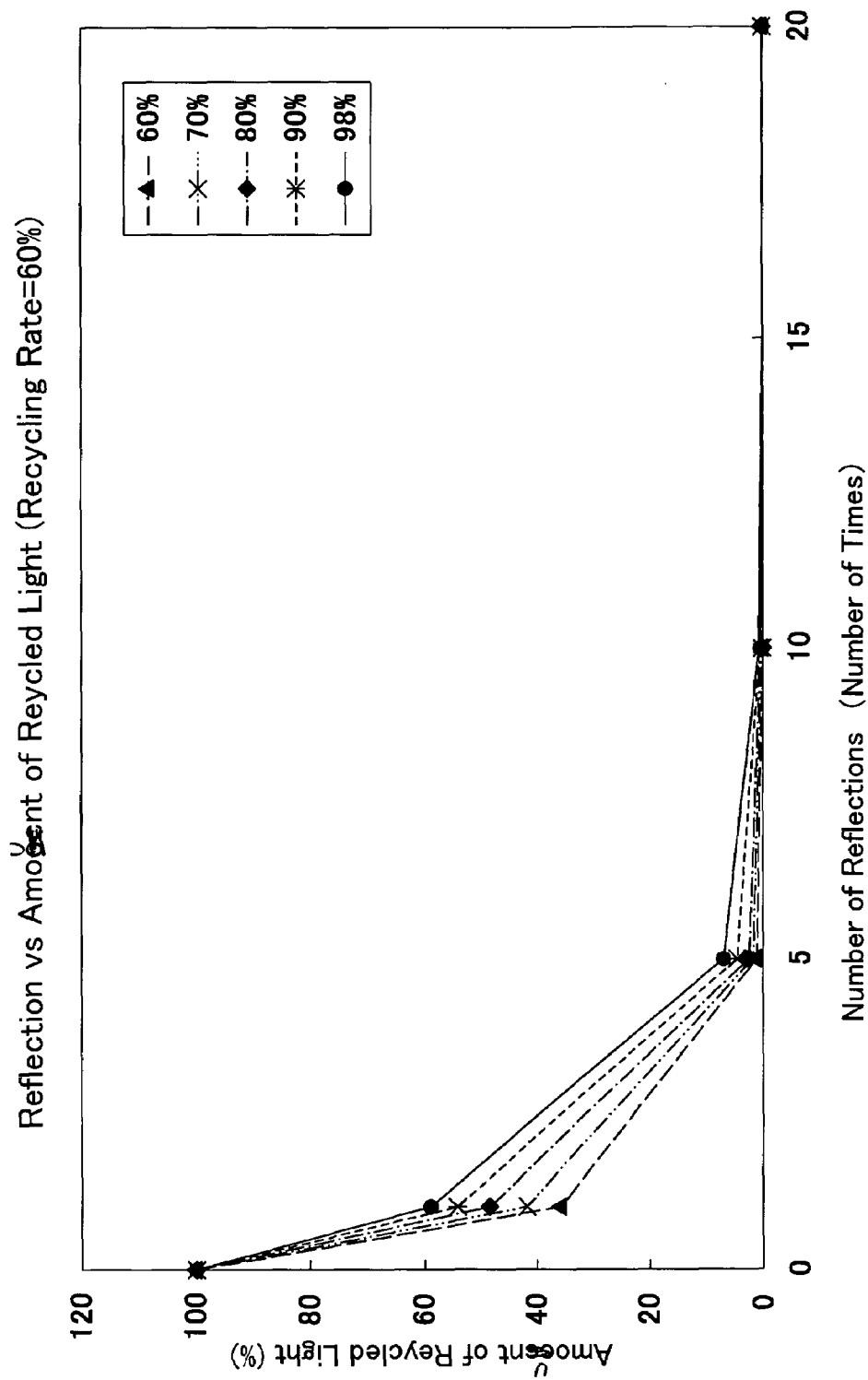
FIG. 14 is a view showing changes in recycled light amount with respect to light reflection numbers when a backlight recycle rate is equal to 60%.

FIG. 14 is a view showing change in the amount of recycled light with respect to the number of light reflections in the case where the recycling rate of the backlight is 60%. In FIG. 14, reflectance of an electrode is a parameter, and the relationship between the number of light reflections and the amount of recycled light is shown in the case where the reflectance of the electrode is 60%, 70%, 80%, 90%, or 98%. FIG. 14 shows that when the reflectance of the electrode is increased, the amount of recycled light is increases irrespective of the number of reflections. For example, when the light reflectance is changed from 60% to 98%, increase in the amount of recycled light is approximately 5% (5 points) of the increase when the number of reflections is 5.

Figure 15:
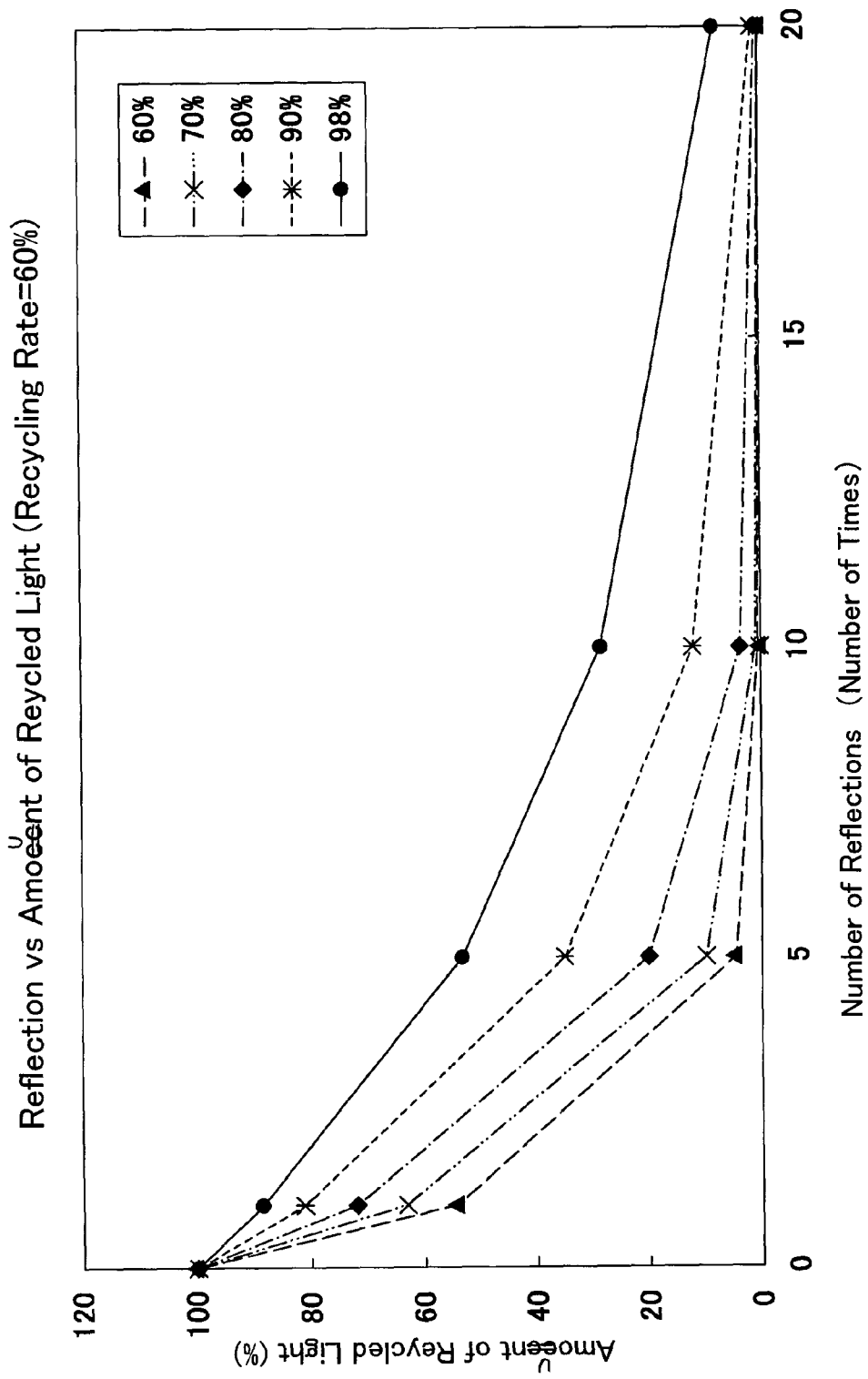
FIG. 15 is a view showing changes in recycled light amount with respect to light reflection numbers when the backlight recycle rate is equal to 90%.

FIG. 15 is a view showing change in the amount of recycled light with respect to the number of light reflections in the case where the recycling rate of the backlight is 90%. Similarly to FIG. 14, in FIG. 15, the relationship between the number of light reflections and the amount of recycled light is also shown in the case where the reflectance of the electrode is 60%, 70%, 80%, 90%, or 98%. FIG. 15 shows that when the light reflectance is changed from 60% to 98%, increase in the amount of recycled light is 50% (50 points) of the increase when the number of reflections is 5 and 30% (30 points) of the increase when the number of reflections is 10. Accordingly, increase in the amount of recycled light with respect to increase in reflectance of an electrode is very large, compared to the case in FIG. 14. Furthermore, when the reflectance of an electrode is changed from 90% to 30%, increase in the amount of recycled light is approximately 20% (20 points) of the increase when the number of reflections is either 5 or 10.

Application of the above-mentioned results to actual electrode materials shows that since the reflectance of Cr-based metallic material is approximately 60%, and the reflectance of Ag-based metallic material is approximately 98%, change of the electrode material from Cr-based to Ag-based will increase the amount of recycled light and thereby improve the luminance. Especially, when the recycling rate of the backlight is large, even small change in the reflectance of electrode from 90% to 98%, that is, change of the electrode material from Al-based to Ag-based, will improve the luminance greatly.

In addition, in the present invention, since each electrode portion 3a, 4a of the common electrode 3 and the pixel electrode 4 is bent, molecules of the liquid crystal 2 are rotated in two directions. Therefore, colors of the liquid crystal panel 101 are offset with respect to each other in the case when the liquid crystal panel is seen from a tilted angle, thereby achieving a liquid crystal panel 101 having less color variation irrespective of viewing directions. Consequently, a liquid crystal display having a wide viewing angle can be achieved.

Furthermore, while each one of the in-panel liquid crystal operation circuit components is entirely made of metallic materials having a high reflectance in the present embodiment, some of the in-panel liquid crystal operation circuit components may be made of metallic materials having a high reflectance, or a certain one of the in-panel liquid crystal operation circuit component may be partially made of metallic material having a high reflectance.

Ninth Embodiment

A ninth embodiment of the present invention exemplifies a liquid crystal display having a common electrode constituted by a transparent electric conductor among liquid crystal displays in which at least either one of a common electrode and a pixel electrode is constituted by a transparent electric conductor.

FIGS. 16a and 16b are views showing a constitution in the vicinity of a pixel portion of a liquid crystal display according to the present invention, wherein FIG. 16a is a plan view, and FIG. 16b is a sectional view taken in the direction of arrows substantially along line XVIb-XVIb of FIG. 16a. In FIGS. 16a and 16b, the same reference numerals as in FIG. 13 denote the same or corresponding elements.

Figure 16:
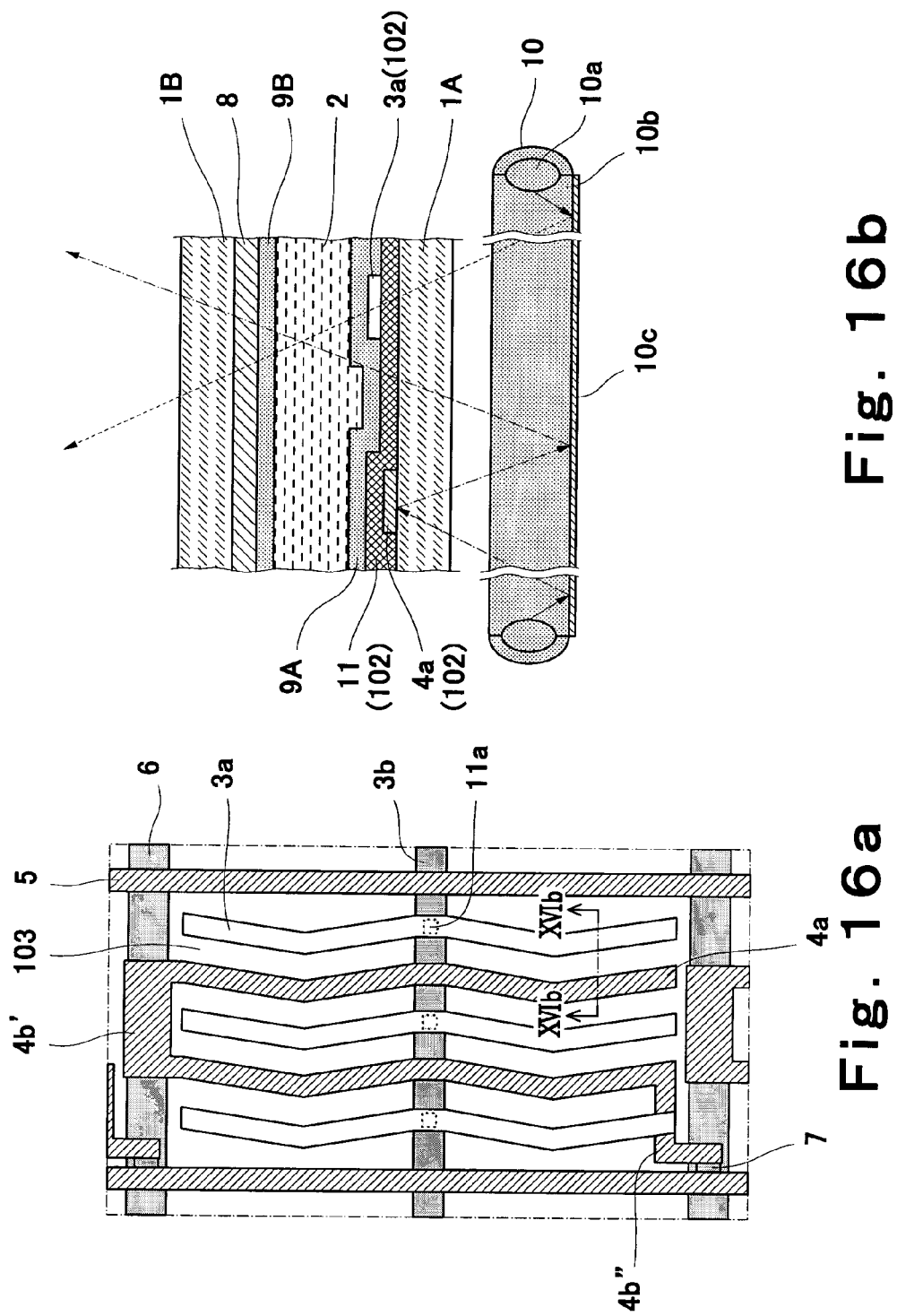

According to the present embodiment, differently from the eighth embodiment, the electrode portion 3a of the common electrode 3 is constituted by the transparent electric conductor, and the wiring portion 3b is made of metallic material having a high reflectance, as shown in FIG. 16. The electrode portion 3a and the wiring portion 3b are separated by an insulating layer (a second insulating layer 11 and a first insulating layer not shown), and the electrode portion 3a and the wiring portion 3b are connected through a contact hole 11a provided in the insulating layer. That is, when seen in a sectional view, the wiring layer 102 is formed on the array substrate 1 by layering the wiring portion 3b of the common electrode and the scanning signal line 6, the first insulating layer (shown by reference numeral 14 in FIG. 19b), the pixel electrode 4 and the video signal line 5, the second insulating layer 11, and the electrode portion 3a of the common electrode in this order and from the bottom up. It should be noted that the first insulating layer is not shown in FIG. 16b for the sake of simple description. The other respects are similar to those of the eighth embodiment.

Next, a fabrication method of the liquid crystal display thus constituted will be described with reference to FIGS. 16a and 16b.

FIGS. 16a and 16b, first of all, a conductive layer made of high reflectance metallic material is formed on the array substrate 1A, and then patterning is performed on the conductive layer so as to form a predetermined shape, thus forming the wiring portion 3b of the common electrode 3 and the scanning signal line 6. The first insulating layer (not shown) is formed so as to cover a surface of the common electrode 3 and the scanning signal line 6. Then, a semiconductor switching device 7 constituted by an a-Si layer and a n⁺-type a-Si layer (both are not shown) is formed on a predetermined portion of the first insulating layer. Furthermore, a conductive layer made of metallic material having a high reflectance is formed on a portion of the first insulating layer where the semiconductor switching device 7 was formed and on a predetermined portion of the semiconductor switching device 7. Patterning is performed on the conductive layer to form a predetermined shape, thus forming the video signal line 5 and the pixel electrode 4.

Then, a second insulating layer 11 made of SiNx or the like is formed on a surface of the array substrate 1A in which the video signal line 5 and the pixel electrode 4 were thus formed. The second insulating layer 11 also plays a role as a protection film for protecting the semiconductor switching device 7.

Then, a transparent conductive layer made of ITO is formed on the second insulating layer 11, and patterning is performed to form a predetermined shape, thus forming the electrode portion 3a of the common electrode.

Here, contact holes 11a (see FIG. 19b) are respectively provided in the first insulating layer and the second insulating layer 11 to achieve an electric conduction between the wiring portion 3b of the common electrode made of metallic material having a high reflectance and three electrode portions 3a of the common electrode constituted by the transparent electric conductor.

Thereafter, the liquid crystal display is attained through the same process steps as in the eighth embodiment.

In the liquid crystal display thus constituted, since the electrode portion 3a of the common electrode 3 is constituted by the transparent electric conductor, the aperture ratio of the array substrate 1A is increased.

However, electric field intensities in areas above the electrode portion 3a of the common electrode 3 and an electrode portion 4a of the pixel electrode 4 are smaller than an electric field intensity in an area positioned between the electrode portion 3a of the common electrode 3 and the electrode portion 4a of the pixel electrode 4. Therefore, in order to substantially increase the aperture ratio of the array substrate 1A, the electrode portion 3a of the common electrode 3 is not only constituted by the transparent electric conductor, but molecules of the liquid crystal 2 positioned above the electrode portion 3a of the common electrode 3 also need to be reliably modulated (alignment is changed).

Hereinbelow, the conditions under which the molecules of the liquid crystal 2 positioned above the electrode portion 3a of the common electrode 3 could be modulated by an electric field generated between the electrode portion 3a of the common electrode 3 and the electrode portion 4a of the pixel electrode 4 will be described. These conditions are requirements on a line width of an electrode, spacing between electrodes, a cell gap, and a liquid crystal material.

Figure 17:
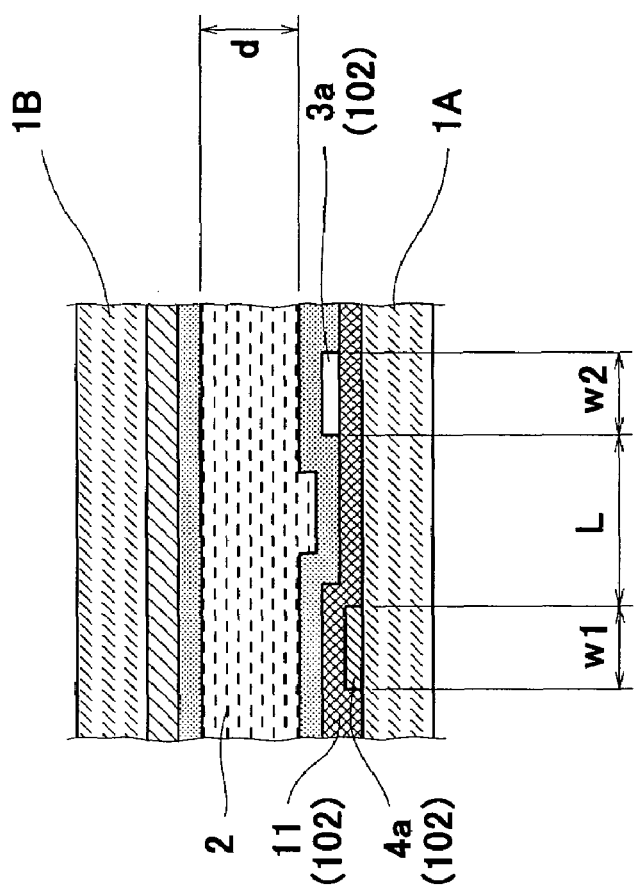
FIG. 17 is a view explaining a dimensional relationship between a line width of an electrode and a cell gap.

FIG. 17 is a view explaining the relationship between a line width of an electrode and a dimension of a cell gap, which is a sectional view showing the same portion as in FIG. 16b.

In FIG. 17, d represents a cell gap, w1 represents a line width of the electrode portion 3a of the common electrode, w2 represents a line width of the electrode portion 4a of the pixel electrode, and L represents spacing between the electrode portion 3a of the common electrode and the electrode portion 4a of the pixel electrode. In the present embodiment, the line width of the electrode portion 3a of the common electrode w1 is equal to 5 µm, the line width of the electrode portion 4a of the pixel electrode w2 is equal to 4 µm, and the spacing between the electrodes L is equal to 10 µm. That is, each of the line widths w1, w2 of the electrode portions 3c, 4b of the common electrode 3 and the pixel electrode 4 is structured to be substantially equal to the spacing (cell gap) d between the array substrate 1A and the opposing substrate 1B. Here, since the electrode portion 3a of the common electrode is constituted by the transparent electric conductor, the line width w1 thereof may be thicker than the line width w2 of the electrode portion 4a of the pixel electrode constituted by the transparent electric conductor.

Furthermore, a cyanide-based liquid crystal material having approximately 10% or 20% of cyanide-based chemical compound is used as a material for the liquid crystal 2, and a retardation $\Delta n \cdot d$ (product of cell gap d and refractive index difference $\Delta n$) is set to approximately 350 nm. In addition, the material for the liquid crystal 2 has a spray elastic constant K11 of 12 (pN), a twist elastic constant K22 of 7 (pN), a bend elastic constant K33 of 18 (pN), and a dielectric constant anisotropy $\Delta \in$ of +8. Here, the dielectric constant anisotropy $\Delta \in$ and the bend elastic constant K33 are important to determine a driving voltage for the liquid crystal. In particular, preferably, the dielectric constant anisotropy $\Delta \in$ is +8 or more, and the bend elastic constant K33 is 18 (pN) or less.

Combining the spacing L of the electrodes, the line widths w1, w2 of the electrodes, and the cell gap d as described above with the liquid crystal 2 thus constituted enables the electric field strength above the electrode portions of the electrodes to be sufficiently increased with a commonly used driving voltage (approximately 5 V), thereby allowing molecules of the liquid crystal 2 positioned above the electrode portions of the electrodes to be modulated to drive the liquid crystal 2. In this way, the molecules of the liquid crystal 2 positioned above the electrode portions of the electrodes are reliably modulated. Thereby, in cooperation with the electrode portion 3a of the common electrode constituted by the transparent electric conductor, the aperture ratio of the array substrate 1A is substantially increased. Consequently, the luminance of the liquid crystal display is improved.

Furthermore, when the spacing L between the electrode portions of the electrodes or the line widths w1, w2 of the electrode portions of the electrodes is grater than the cell gap d, only a transversal electric field is generated. However, when the spacing L between the electrode portions of the electrodes or the line widths w1, w2 of the electrode portions of the electrodes is equal to or smaller than the cell gap d, not only a transversal electric field is generated, but a vertical electric field due to peripheral electric fields of the electrodes is also generated. For example, when the spacing L between the electrode portions of the electrodes is equal to 3 µm, the line widths w1 and w2 are equal to 4 µm, and the cell gap d is equal to 5 µm, not only a transversal electric field but also a vertical electric field are generated, thereby increasing the electric field strength above the electrode portions of the electrodes. Consequently, a high transmittance is achieved. Therefore, the spacing L between the electrode portions of the electrodes and the line widths w1, w2 of the electrode portions of the electrodes are preferably smaller than the cell gap d.

Furthermore, line widths of the electrode portion 3a of the common electrode and the electrode portion 4a of the pixel electrode are preferably 1 µm or more and 10 µm or less in consideration of fabrication conditions in addition to modulation conditions for the molecules of the liquid crystal 2.

It should be noted that, of course, in the present embodiment, since the in-panel liquid crystal operation circuit components excluding the electrode portion 3a of the common electrode are made of metallic material having a high reflectance, the effect of improving the luminance by recycled light could be obtained, similarly to the eighth embodiment. However, in the present embodiment, since the electrode portion 3a of the common electrode is constituted by the transparent electric conductor, slight increase in the line width thereof will not substantially decrease the aperture ratio. Accordingly, in the case where the effect of improving the luminance by recycled light cannot be obtained much, it is preferable that the pixel electrode 4 constituted by the non-transparent electric conductor should be downsized as much as possible, and the line width of the electrode portion 3a of the common electrode should be widened.

Furthermore, similarly to the eighth embodiment, when the scanning signal line 6 and the common electrode 3 are formed in the same layer, a distance between the electrode portion 3a of the common electrode and the scanning signal line 6 becomes 3-6 µm. Since they are formed very close to each other, there have been a high probability that a fault occurs due to short-circuit. However, in the present embodiment, the electrode portion 3a of the common electrode is formed in a layer separated by first and second insulating layers from a layer in which the scanning signal line 6 is formed, thereby eliminating the fault due to short-circuit.

While, in the above description, only the electrode portion 3a of the common electrode is constituted by the transparent electric conductor, the electrode portion 4a of the pixel electrode 4 may be constituted by the transparent electric conductor. In this case, a wiring portion of the pixel electrode is formed in the same layer that the pixel electrode 4 is formed in the case described above, and the electrode portion of the pixel electrode is formed in the same layer that the electrode portion 3a of the common electrode 3 is formed in the case described above. It should be note that both of the electrode portions of the common electrode and the pixel electrode may be constituted by the transparent electric conductor.

Furthermore, in the present embodiment, the semiconductor switching device 7 is constituted by the channel etching type TFT. Since the second insulating layer also plays a role as a protection layer, employing the channel etching type TFT in the liquid crystal display in which the electrode portions of the electrodes are constituted by the transparent electric conductor provides optimum constitution with respect to the process.

Tenth Embodiment

A tenth embodiment of the present invention exemplifies a liquid crystal display constituted such that in-panel liquid crystal operation circuit components are constituted by a plurality of layers having different reflectance, an array substrate side layer has a high reflectance, and a liquid crystal side layer has a low reflectance.

Figure 18:
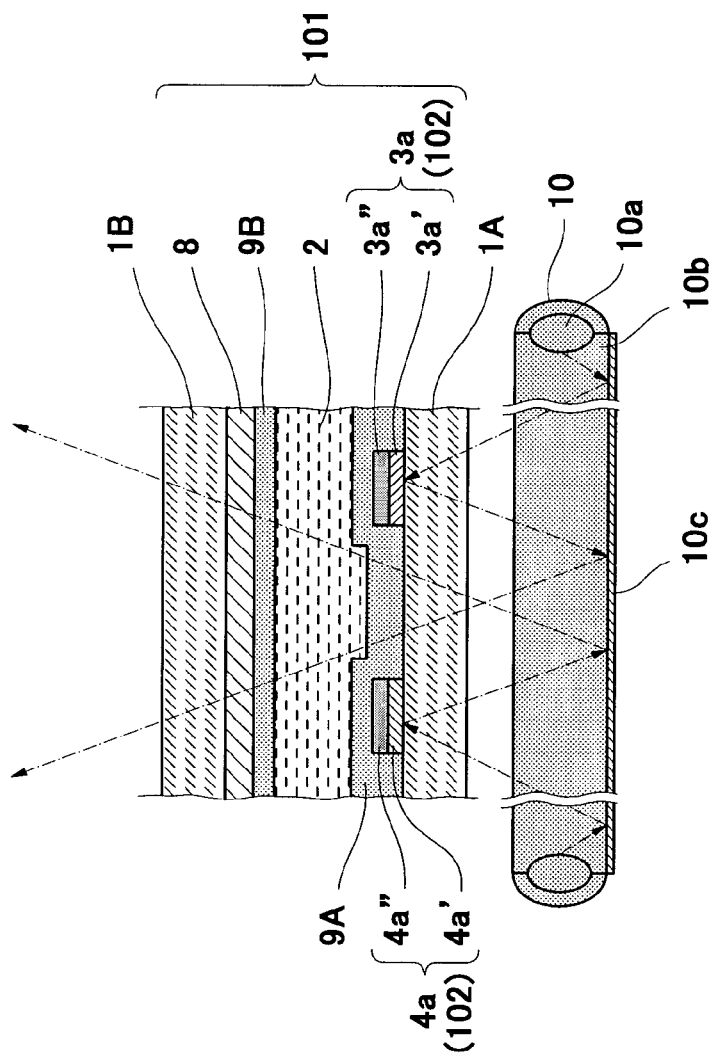
FIG. 18 is a sectional view showing a partial constitution of a pixel portion of a liquid crystal display according to a tenth embodiment of the present invention.

FIG. 18 is a view showing a constitution of a portion of a pixel portion of a liquid crystal display according to a tenth embodiment of the present invention. In FIG. 18, the same reference numerals as in FIG. 13b denote the same or corresponding elements. A constitution in the vicinity of the pixel of the liquid crystal display according to the present embodiment, when seen in a plan view, is identical to the liquid crystal display 100 of the eighth embodiment, that is, the constitution shown in FIG. 13a. FIG. 18 is a sectional view taken in the direction of arrows substantially along line XIIIb-XIIIb of FIG. 13a.

In FIG. 18, the electrode portion 3a of the common electrode 3 has a two-layer structure constituted by a high reflectance layer 3a' formed in the array substrate 1A side and a low reflectance layer 3a" formed in the liquid crystal 2 side. Furthermore, the electrode portion 4a of the pixel electrode 4 has a two-layer structure constituted by a high reflectance layer 4a' formed in the array substrate 1A side and a low reflectance layer 4a" formed in the liquid crystal 2 side. The high reflectance layers 3a', 4a' of the electrode portions 3a, 4a of both electrodes 3, 4 are made of metallic material having a high reflectance, and the low reflectance layers 3a", 4a" are made of, for example, Cr-based metallic material having a reflectance of approximately 60%. Other in-panel liquid crystal operation circuit components that are not shown, that is, a wiring portion of the common electrode, a wiring portion of the pixel electrode, the video signal line, the scanning line, and a wiring portion of the semiconductor switching device also have the same two-layer structures as described above.

Function and effects of the liquid crystal display thus constituted will be described. If all of the in-panel liquid crystal operation circuit components are constituted by the high reflectance electric conductor similarly to the eighth embodiment, a reflected light due to an ambient light such as room light, that is, an undesired light is increased, and the amount of light in dark display is increased, thereby causing the contrast to be decreased. Therefore, formation of a low reflectance layer in a side of the in-panel liquid crystal operation circuit components where the liquid crystal panel 101 is seen, that is, in the opposing substrate 1B side enables a portion of the undesired light to be absorbed, thereby suppressing decrease in the contrast due to the undesired light.

It should be noted that in the case where the high reflectance layer is constituted by the high reflectance electric conductor, a thickness thereof may be any thickness which can reflect a light satisfactorily but not necessarily determined based on an electric resistance thereof. For example, 2000 angstrom or more may be suitable.

Furthermore, the low reflectance layer is not necessarily constituted by the electric conductor; the low reflectance layer may be made of non-conductive material having a low reflectance.

Furthermore, while, in the above description, the in-panel liquid crystal operation circuit components are of two-layer structure, the in-panel liquid crystal operation circuit components may be constituted by 3 or more layers. For example, a structure in which an ordinary conductive layer is retained between a low reflectance layer and a high reflectance layer may be suitable.

Eleventh Embodiment

Figures 19A, 19B:
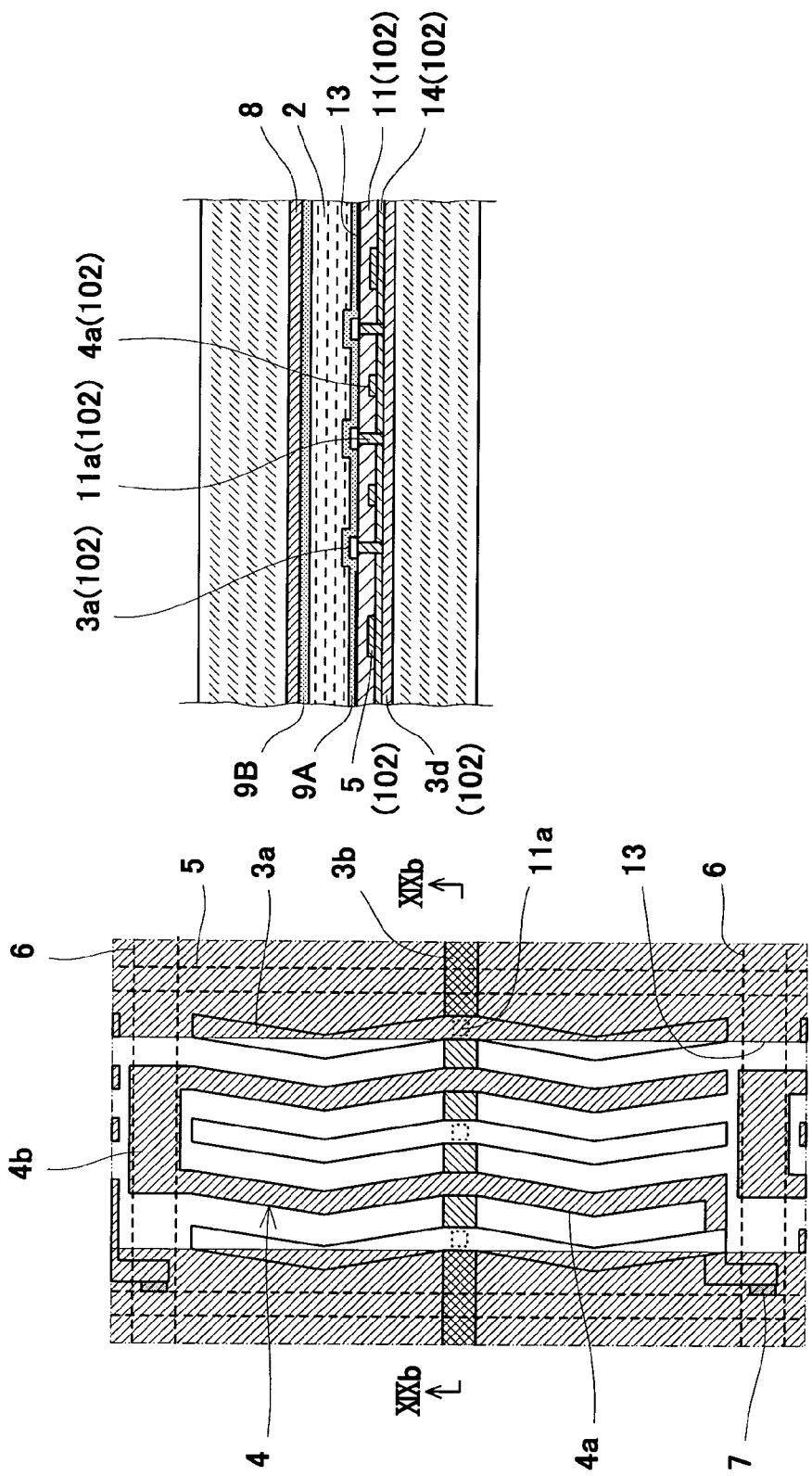

FIGS. 19a and 19b are views showing a constitution in the vicinity of a pixel portion of a liquid crystal display according to an eleventh embodiment of the present invention, wherein FIG. 19a is a plan view, and FIG. 19b is a sectional view taken in the direction of arrows substantially along line XIXb-XIXb of FIG. 19a. In FIGS. 19a and 19b, the same reference numerals as in FIG. 16 denote the same or corresponding elements.

As shown in FIGS. 19a and 19b, differently from the ninth embodiment, a light-blocking layer 13 is provided on the array substrate 1A in the present embodiment. The light-blocking layer 13 is formed between the second insulting layer 11 and the alignment layer 9A so as to be positioned above the video signal line 5 and have a wider width than the video signal line 5. Accordingly, the light-blocking layer 13 is formed to be stripe-shaped in the present embodiment. The other respects are similar to those of the ninth embodiment. Reference numeral 14 denotes the first insulating layer not shown in FIG. 16. Furthermore, although not shown in FIG. 16, the contact hole 11a is filled with an electric conductor. In this constitution, since the light-blocking layer 13 is formed on the array substrate 11A together with wiring of the video signal line 5, the accuracy of positioning of the light-blocking layer 13 is determined by the accuracy of printing at the time of manufacturing, thereby suppressing decrease in the aperture ratio due to displacement in bonding the array substrate 1A and the opposing substrate 1B. Consequently, a liquid crystal panel having a high aperture ratio and a high luminance can be achieved.

Twelfth Embodiment

FIGS. 20a and 20b are views showing a constitution in the vicinity of a pixel portion of a liquid crystal display according to an twelfth embodiment of the present invention, wherein FIG. 20a is a plan view, and FIG. 20b is a sectional view taken in the direction of arrows substantially along line XXb-XXb of FIG. 20a. In FIGS. 20a and 20b, the same reference numerals as in FIG. 13 denote the same or corresponding elements.

As shown in FIGS. 20a and 20b, differently from the eighth embodiment, the common electrode 3 is constituted by a so-called multi-layer common electrode, and the video signal line 5 is constituted by a so-called multi-layer video signal line. That is, the common electrode 3 includes an electrode portion 3c' located in a pixel 103 similar to the eighth embodiment and, in addition thereto, an electrode portion 3c" located above the video signal line 5, that is, above a borderline of the pixel 103, and these electrode portions 3c', 3c" are connected by a wiring portion 3b. Describing more in detail, an electrode portion 4a and wiring portions 4b', 4b" of the pixel electrode 4 and the video signal line 5 are formed on an upper surface of the array substrate 1A, an insulating layer 11 is formed thereon, and the electrode portions 3c', 3c" of the common electrode 3 are formed on the insulating layer 11. The electrode portions 3c', 3c" of the common electrode 3 and the electrode portion 4a of the pixel electrode 4 are formed so as to extend linearly in an extending direction of the video signal line 5. Furthermore, the electrode portion 3c" located above the vide signal line 5 of the common electrode 3 is formed so as to have a slightly wider width than the video signal line 5. The other respects are similar to those of the eighth embodiment.

In this constitution, since a transversal electric field is formed as far as an area close to the borderline of the pixel 103, a substantial aperture ratio of the array substrate can be increased. Consequently, a liquid crystal display having a high luminance can be obtained.

Thirteenth Embodiment

Figure 21:
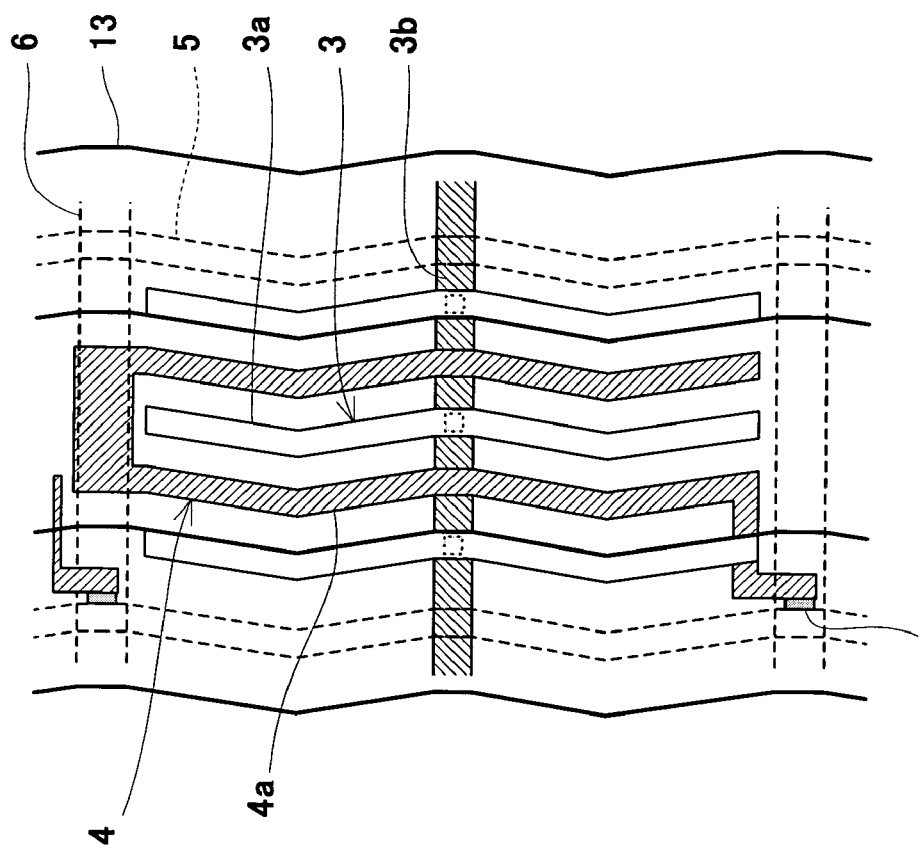
FIG. 21 is a plan view showing a constitution in a vicinity of pixel portion of a liquid crystal display according to a thirteenth embodiment of the present invention.

FIG. 21 is a plan view showing a constitution in the vicinity of a pixel portion of a liquid crystal display according to a thirteenth embodiment of the present invention. In FIG. 21, the same reference numerals as in FIG. 19 denote the same or corresponding elements.

As shown in FIG. 21, differently from the eleventh embodiment, in the present embodiment, the video signal line 5 and the light-blocking layer 13 are formed so as to be bent in a zigzag and extend conforming in shape to respective electrode portions 3a, 4a of sideways-pointing-shaped common and pixel electrodes 3, 4 in a direction perpendicular to an extending direction of the scanning signal line 6. The other respects are similar to those of the eleventh embodiment. In this constitution, increase in light-blocking area caused by bending the electrode portion 3a, 4a of each electrode 3, 4 can be prevented. Consequently, a liquid crystal display having a high luminance can be obtained.

Fourteenth Embodiment

Figure 22B:
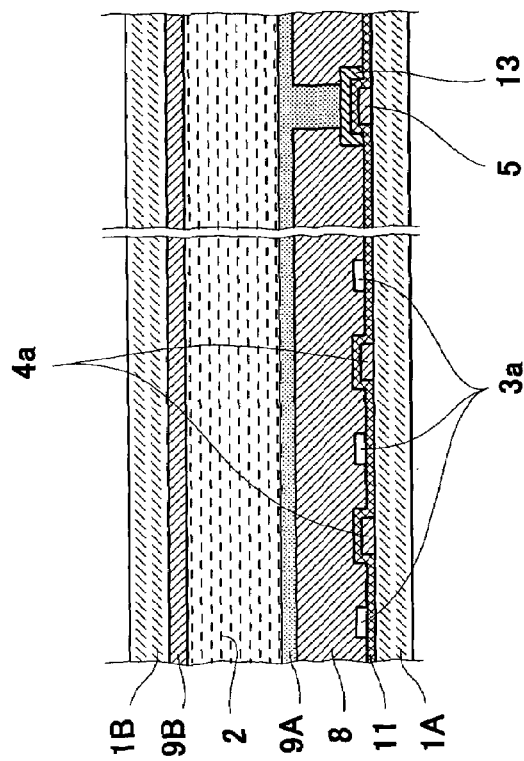
Figure 22A:
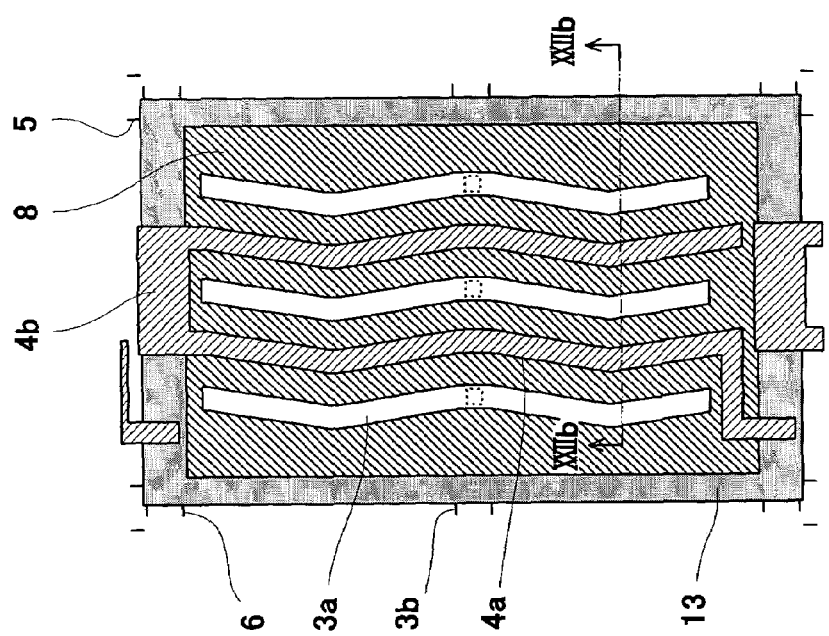

FIGS. 22a and 22b are views showing a constitution in the vicinity of a pixel portion of a liquid crystal display according to an fourteenth embodiment of the present invention, wherein FIG. 22a is a plan view, and FIG. 22b is a sectional view taken in the direction of arrows substantially along line XXIIb-XXIIb of FIG. 22a. In FIGS. 20a and 20b, the same reference numerals as in FIG. 16 denote the same or corresponding elements.

As shown in FIGS. 22a and 22b, differently from the ninth embodiment, the light-blocking layer 13 and a color filter 8 are formed on the array substrate 1A in the present embodiment. The other respects are similar to those of the ninth embodiment. In this constitution, since the light-blocking layer 13 and the color filter 8 are formed on the array substrate 1A together with wirings of the video signal line 5, the scanning signal line 6, and the like, accuracy of positioning of the light-blocking layer 13 and the color filter 8 is determined by accuracy of printing at the time of manufacturing, thereby suppressing decrease in an aperture ratio due to displacement in bonding the array substrate 1A and the opposing substrate

Fifteenth Embodiment

A fifteenth embodiment of the present invention is a combination of the first embodiment and the tenth embodiment.

Figure 23:
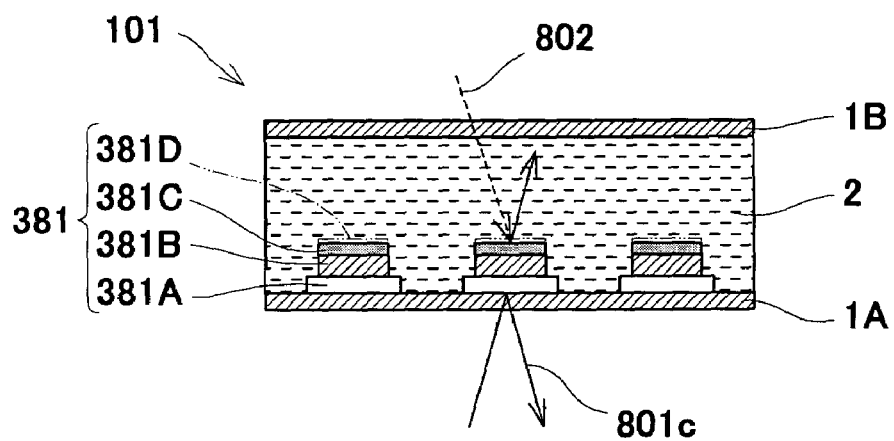
FIG. 23 is a sectional view schematically showing a constitution of a liquid crystal display according to a fifteenth embodiment of the present invention.

FIG. 23 is a sectional view schematically showing a constitution of a liquid crystal display according to the present embodiment. In FIG. 23, the same reference numerals as in FIG. 12 denote the same or corresponding elements.

As shown in FIG. 23, in the liquid crystal display according to the present embodiment, in-panel liquid crystal operation circuit components 381 formed on an inner face of the array substrate 1A is constituted by a transparent layer 381A formed on the array substrate 1A and a non-transparent layer 381B, 381C formed thereon and having a narrower width than it. Then, the non-transparent layer 381B, 381C includes a plurality of layers (two layers, herein), a layer closest to the array substrate 1A is made of material having a highest reflectance, a layer 381C closest to the liquid crystal layer is made of material having a lowest reflectance, and a blackening process is performed on a surface thereof (380D). The transparent layer is made of, for example, ITO. Furthermore, the layer 381B is made of, for example, silver Ag-based alloy, and the layer 381C is made of, for example, chromium Cr-based alloy. Also, a blackening process of the layer 381C is performed by, for example, providing a low reflectance chromium layer 381D thereon, or performing plasma-treatment after providing silver Ag-based material thereon.

In this constitution, similarly to the first embodiment, the contrast and the luminance are improved because of the two-layer structures of the transparent layer 381A and the non-transparent layer 381B, 381C. Furthermore, even when an ambient light 802 is incident from the opposing substrate 1B on the in-panel liquid crystal operation circuit components 381, since a surface thereof is blackened, reflection is prevented. Consequently, the contrast of the display screen is improved.

Furthermore, for the purpose of simplification, the blackening process (381D) may be omitted. Even in this case, improvement in the contrast can be obtained because of the reduction of undesired light.

Sixteenth Embodiment

Figure 24:
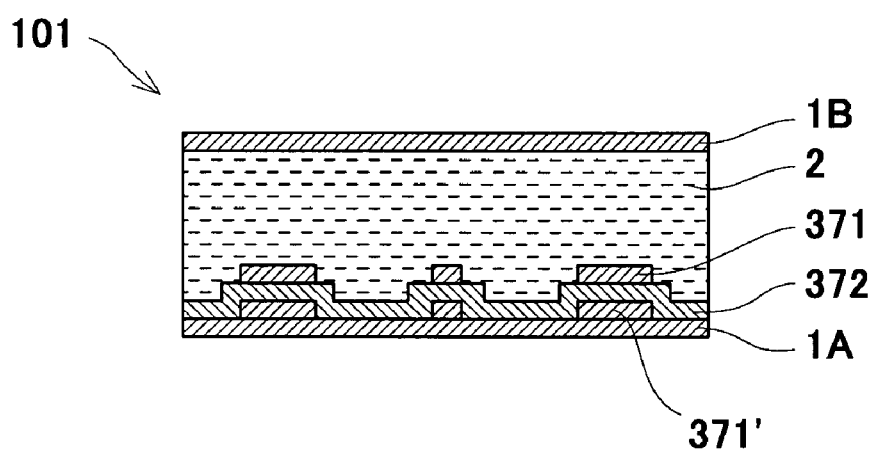
FIG. 24 is a sectional view schematically showing a constitution of a liquid crystal display according to a sixteenth embodiment of the present invention.
Figure 25:
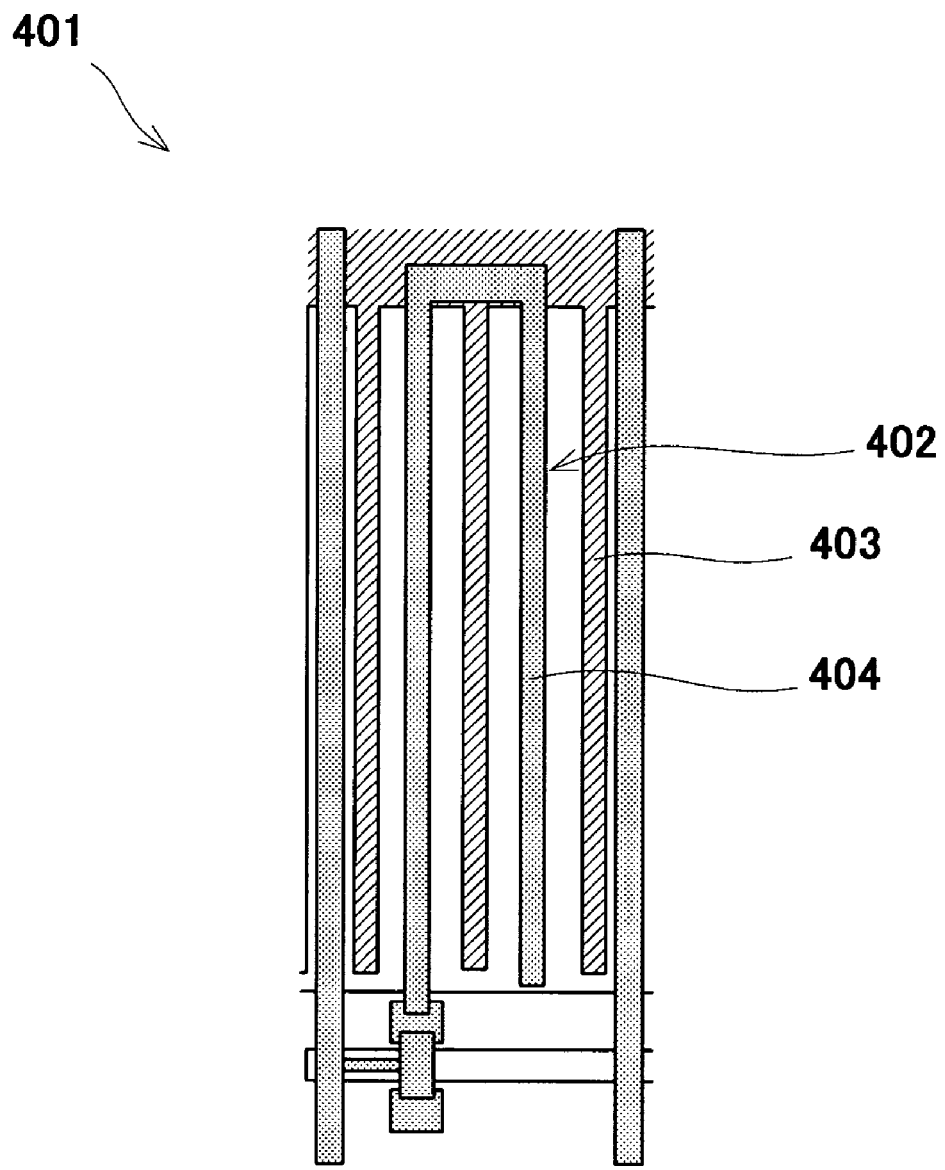
FIG. 25 is a plan view schematically showing a constitution of a pixel of a conventional liquid crystal display.
Figure 26A:
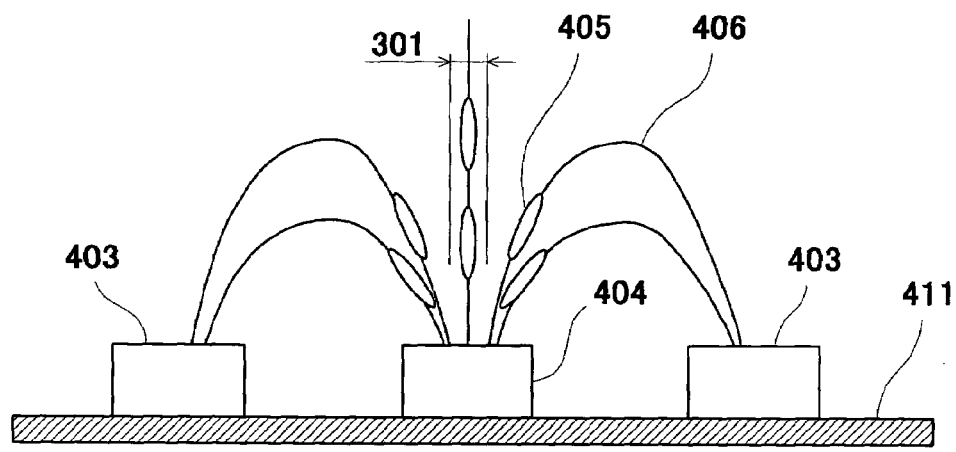
Figure 26B:
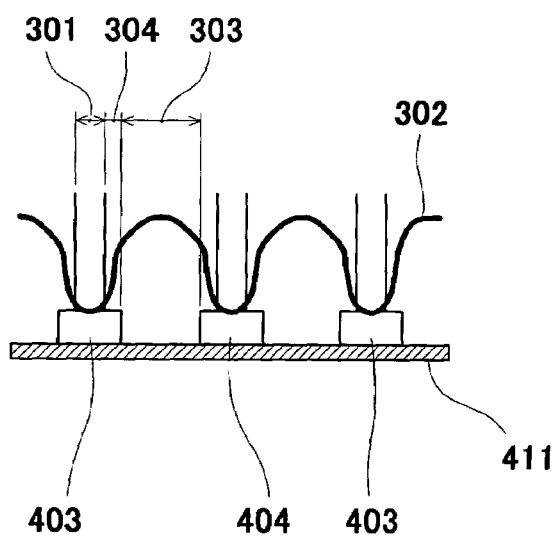

FIG. 24 is a sectional view schematically showing a constitution of a liquid crystal display according to a sixteenth embodiment of the present invention. In FIG. 24, the same reference numerals as in FIG. 12 denote the same or corresponding elements.

As shown in FIG. 24, in the present embodiment, a high reflectance layer 371' is formed below in-panel liquid crystal operation circuit components 371 formed on the array substrate 1A with an insulating layer 372 interposed therebetween. The high reflectance layer 371' is made of, for example, silver Ag-based material and formed so as to overlap with the in-panel liquid crystal operation circuit components 371 when seen in a direction perpendicular to the liquid crystal panel 101.

In this constitution, the amount of recycled light is increased, and the luminance of the display screen is improved. It should be noted that this constitution could be similarly applied to non-transparent wirings such as scanning signal line, video signal line and the like formed on an array substrate of a TN-mode liquid crystal display.

In the first to seventh embodiments, the two-layer structure including a layer constituted by a transparent body (a transparent electric conductor or a transparent dielectric substance) and a layer constituted by a non-transparent body (a non-transparent electric conductor or a non-transparent dielectric substance) in the structure formed in the pixel may be formed by forming a layer constituted by a transparent body and then a layer constituted by a non-transparent body having a narrower width than the layer constituted by a transparent body. Furthermore, such a structure constituted by a non-transparent portion and a transparent portion may be such that, when seen in a direction perpendicular to the liquid crystal panel, an edge thereof is constituted by a transparent body, and a central portion thereof is constituted by a non-transparent body, and therefore may be structured such that an island-shaped non-transparent portion is surrounded by an annular transparent portion, rather than the two-layer structure.

In the eighth to eleventh and fourteenth embodiments, the electrode portions may be of other shape than bent-shape, that is, of linear-shape, enclosure-shape, and the like. In either shape, an effect of substantially increasing the aperture ratio can be obtained.

In the first to fifteenth and eighth to fourteenth embodiments, while the case where the semiconductor switching device was constituted by the channel etching type TFT was described, the semiconductor switching device may be constituted by a channel protection-type TFT or any other type of semiconductor switching device.

In the eighth to fourteenth embodiments, if the semiconductor switching devices are constituted by an active semiconductor layer made of p-Si (polysilicon), the semiconductor switching device can be downsized. Specifically, for example, in the TFT 160 shown in FIG. 1b, a channel portion can be constituted by a polysilicon p-si layer in place of the amorphous silicon a-si layer 162, and the source area and drain area can be constituted by N-type polysilicon $n^+$p-Si layer in place of N-type amorphous silicon $n^+$a-Si layer 163. While, the above embodiments, FIGS. 13, 16, 19, 20, 21 illustrate the semiconductor switching device 7 as being placed in the area above the scanning signal line 6, the semiconductor switching device actually runs over the area of the pixel 103. Therefore, downsizing of the semiconductor switching device 7 enables the aperture ratio of the array substrate 1A to be increased. Consequently, a liquid crystal display having a high luminance can be obtained.

In the first to fourteenth embodiments, the backlight was used as a light source. Alternatively, only a reflecting plate may be provided, and a reflected light obtained in such a way that an ambient light from the opposing substrate side is reflected on the reflecting plate may be used as a light source.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

The invention claimed is:

1. A liquid crystal display comprising: a liquid crystal panel in which liquid crystal is retained between a pair of substrates, a pixel electrode for applying a voltage to change a transmittance of a display light, and more than one structure formed on an inner surface of one of the substrates for dividing the liquid crystal of a pixel into a plurality of domains so as to generate a disclination region in a boundary region of the plurality of domains, the disclination region having a modulation rate that is lower than a modulation rate of the domains, wherein:

each of the structures is at least partially constituted by a light-transmitting portion and a light-non-transmitting portion;

an edge portion of each of the structures in a plan view is constituted by the light-transmitting portion;

a central portion of each of the structures in a plan view is constituted by the light-non-transmitting portion;

each of the structures are disposed to be opposite to the pixel electrode in a plan view; and the light-transmitting portion of each of the structures is formed by an electrically conductive material.

2. The liquid crystal display according to claim 1, wherein the more than one structure divides the liquid crystal of the pixel into the plurality of domains by controlling an alignment of the liquid crystal.

3. The liquid crystal display according to claim 1, wherein the more than one structure divides the liquid crystal of the pixel into the plurality of domains by applying a voltage to the liquid crystal.

4. The liquid crystal display according to claim 1, wherein each of the structures are formed such that the light non-transmitting portion is surrounded by the light-transmitting portion when seen in a direction perpendicular to the liquid crystal panel.

5. The liquid crystal display according to claim 1, wherein each of the structures are formed such that the light-non-transmitting portion is formed on the inner surface of the one of the substrates and the light-transmitting portion is formed to cover a periphery of the light-non-transmitting portion.

6. The liquid crystal display according to claim 1, wherein the light-non-transmitting portion of each of the structures is reflective.

7. A liquid crystal display of transversal electric field type comprising:

a liquid crystal panel in which liquid crystal is retained between a pair of substrates;

a plurality of scanning signal lines and a plurality of video signal lines formed so as to define a plurality of pixels in a matrix on an inner surface of one of the pair of substrates; and a pixel electrode and a common electrode formed opposite to each other in each pixel in a plan view, wherein an image is displayed on the liquid crystal panel by inputting a video signal from the video signal line into the pixel electrode while sequentially selecting the pixel through the scanning signal line, wherein at least one of the scanning signal lines, the video signal lines, the pixel electrode, or the common electrode is at least partially constituted by a light-transmitting conductive layer and a light-non-transmitting conductive layer; and wherein a width of the light-transmitting conductive layer is wider than a width of the light-non-transmitting layer.

8. The liquid crystal display according to claim 7, wherein the light-non-transmitting conductive layer is layered on the inner surface of the one of the pair of substrates substrate and the light-transmitting conductive layer is layered on the light-non-transmitting conductive layer.

9. The liquid crystal display according to claim 7, wherein an electrical conductivity of the light-non-transmitting conductive layer is higher than an electrical conductivity of the light-transmitting conductive layer.

10. A liquid crystal display of transversal electric field type comprising:

a liquid crystal panel in which liquid crystal is retained between a pair of substrates;

a plurality of scanning signal lines and a plurality of video signal lines formed so as to define a plurality of pixels in a matrix on an inner surface of one of the pair of substrates, and a pixel electrode and a common electrode formed opposite to each other in each pixel in a plan view, wherein an image is displayed on the liquid crystal panel by inputting a video signal from the video signal line into the pixel electrode while sequentially selecting the pixel through the scanning signal line, wherein at least one of the scanning signal lines, the video signal lines, the pixel electrode, or the common electrode which is disposed closest to the inner surface of the one of the pair of substrates is at least partially constituted by a light-transmitting conductive layer and a light-non-transmitting conductive layer, and the light-non-transmitting conductive layer is layered on the inner surface of the one of the pair of substrates and the light-transmitting conductive layer is layered on the light-non-transmitting conductive layer.

11. The liquid crystal display according to claim 10, wherein the light-non-transmitting conductive layer is a Ag-based material.

* * * * *

UNITED STATES PATENT AND TRADEMARK OFFICE
CERTIFICATE OF CORRECTION

PATENT NO.       : 7,414,682 B2                                    Page 1 of 1
APPLICATION NO.  : 10/343464
DATED            : August 19, 2008
INVENTOR(S)      : Akinori Shiota et al.

It is certified that error appears in the above-identified patent and that said Letters Patent is hereby corrected as shown below:

On the title page of the patent, Item "(30) Foreign Application Priority Data", below "Jul. 31, 2000 (JP)......2000-230449" insert --Aug. 25, 2000 (JP)......2000-255135--.

Signed and Sealed this

Seventeenth Day of March, 2009

JOHN DOLL
*Acting Director of the United States Patent and Trademark Office*